United States Patent
Taubert et al.

(10) Patent No.: US 6,721,353 B1
(45) Date of Patent: Apr. 13, 2004

(54) NETWORK COMPATIBILITY

(75) Inventors: Derek A. Taubert, Newark, CA (US); Shalabh Agarwal, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 592 days.

(21) Appl. No.: 09/598,581

(22) Filed: Jun. 21, 2000

(51) Int. Cl.$^7$ ................................ H04B 1/38; H04L 5/16
(52) U.S. Cl. ................................ 375/220; 370/466
(58) Field of Search ........................ 375/220; 370/353, 370/389, 419, 466, 467, 352; 709/250, 236

(56) References Cited

U.S. PATENT DOCUMENTS

| | | | | |
|---|---|---|---|---|
| 5,073,852 A | * | 12/1991 | Siegel et al. | 709/313 |
| 5,778,189 A | * | 7/1998 | Kimura et al. | 709/236 |
| 6,215,783 B1 | * | 4/2001 | Neyman | 370/353 |
| 6,229,809 B1 | * | 5/2001 | Murphy et al. | 370/401 |
| 6,272,551 B1 | * | 8/2001 | Martin et al. | 709/250 |

* cited by examiner

Primary Examiner—Phoung Phu
(74) Attorney, Agent, or Firm—Campbell Stephenson Ascolese LLP

(57) ABSTRACT

A method for improving network compatibility, said method including but not limited to the following: receiving a first-protocol data-link layer packet having a first-protocol address, the first-protocol data-link layer packet encapsulating a network-layer packet bound for a network layer entity native to a second-protocol data link layer environment; directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address; and transmitting the at least one second-protocol data-link layer packet into the second-protocol data-link layer environment. In other embodiments, hardware and/or software effect the foregoing referenced method.

30 Claims, 38 Drawing Sheets

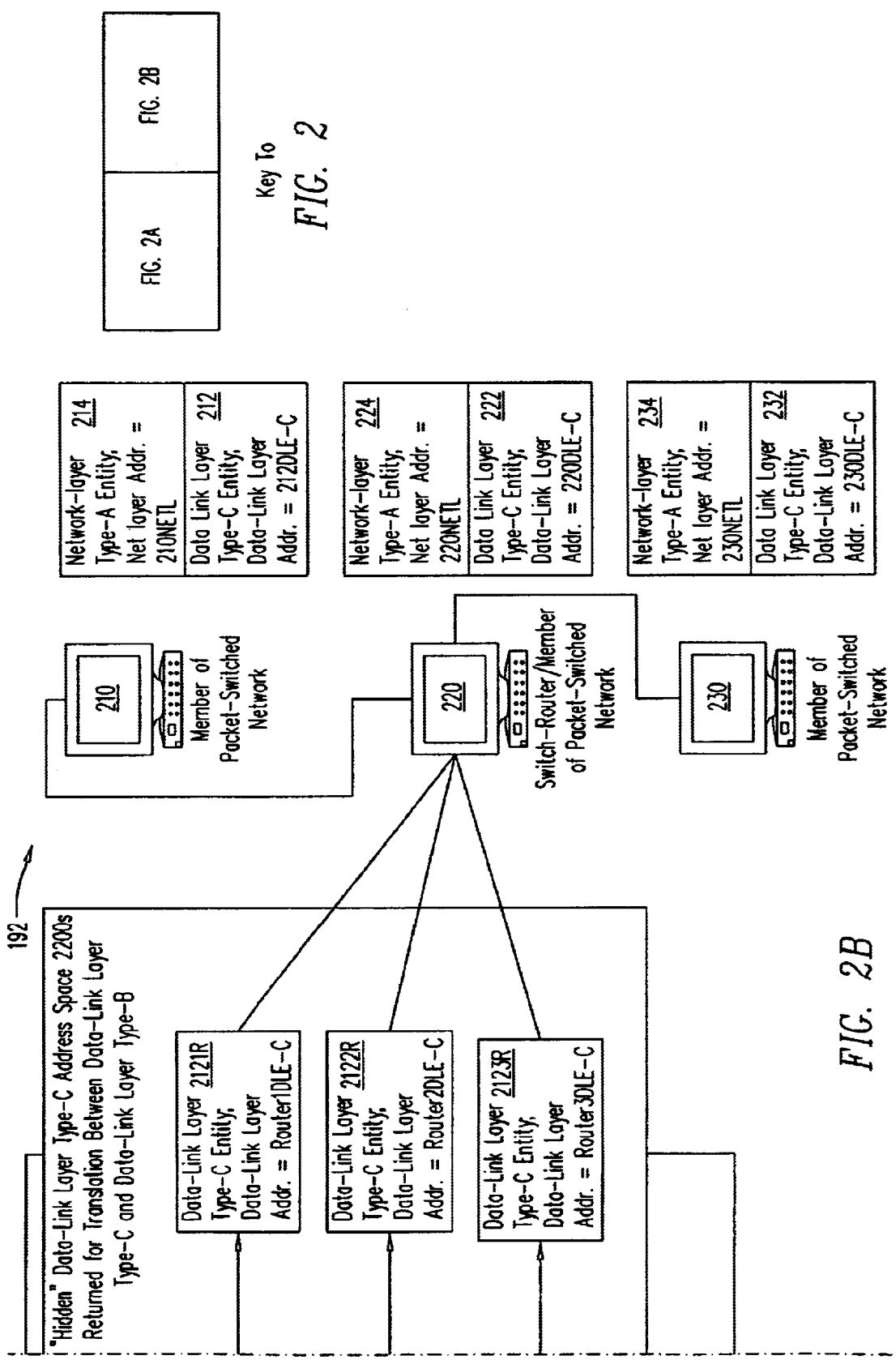

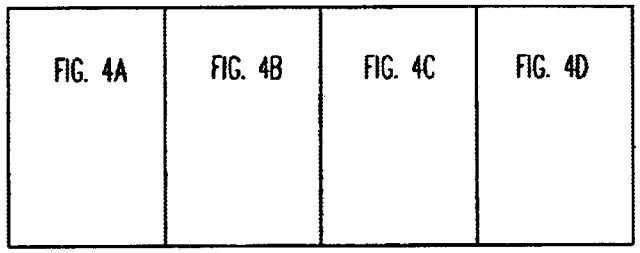

Key To
*FIG. 4*

Note: In the unusual case in which data-link layer type-B does not have unique data link layer addressing (e.g. point-to-point protocol, the logical companionings referenced here in Figure 4 still hold; however, in this case, since all data-link layer type-B packets received look the same, compatibility device examines the network source header of network packets contained within the data-link layer packets to discern which "pair" of data-link layer type-B entities the received data link layer Type-B packet should be associated with (e.g. If the received data-link layer type-B packet has within it a network layer type-A packet having network layer address 120NETL, it is known that the data-link layer Type-B packet should be associated with the "pair" data link data link layer entity 124 and 1241 (since data-link layer type-B entity 124 is co-resident with the network layer entity having address 120NETL-see Figure 2). Once this correct data link Layer Type-B pairing has been received the companioning of this Figure 4 can be utilized to make the appropriate data-link layer header substitutions.

*FIG. 4D*

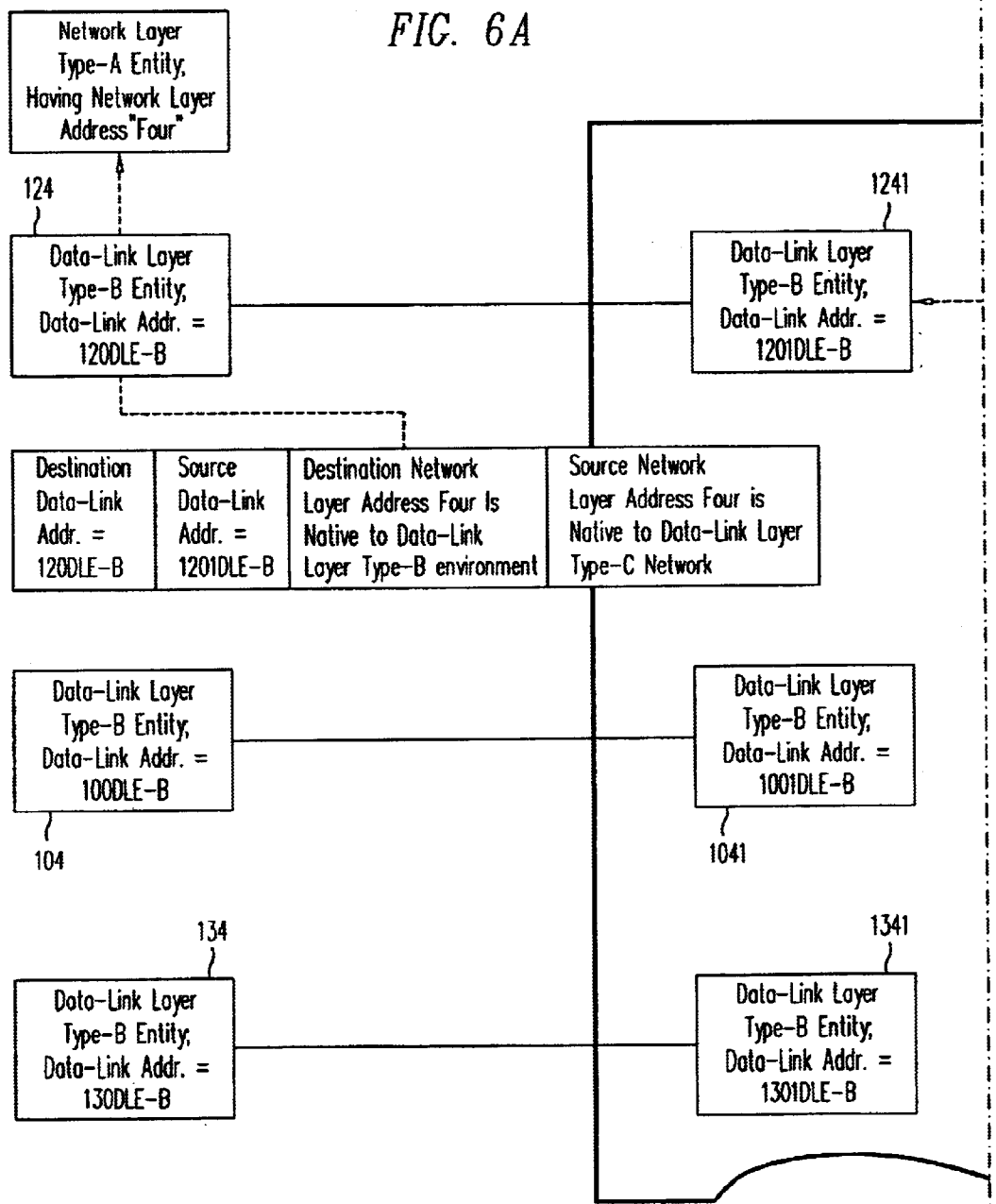

FIG. 6A

If (Network Layer router in Data-Link Layer Type-C environment detects network layer packet having as a destination a network layer entity in Data-Link Layer Type-B environment) and (network layer router detects received network layer packet indicates unicast transmission)
then
address Data-Link Layer Type-C packet to a destination data-link layer Type-C address in compatibility device most closely companioned with the data-link layer type B address associated with the desired network layer destination entity transmit the Data-Link Layer Type-C packet into the compatibility device Key To If (Network Layer router in Data-Link Layer Type-C environment detects network layer packet having as a destination a network layer entity in Data-Link Layer Type-B environment) and (network layer router detects received network layer packet indicates multicast or broadcast transmission)
then
address one Data-Link Layer Type-C packet to the one destination data-link layer Type-C address in compatibility device, where the one destination data link layer Type-C packet is defined to be associated with the multicast, directed broadcast, or broadcast group; transmit the Data-Link Layer Type-C packet into the compatibility device;
compatibility device, upon receipt of the Type-C packet is defined to be associated with the multicast, directed broadcast, or broadcast group creates one or more data-link layer type B packets having destination addresses associated with the desired one or more network layer destination entities in the defined multicast, directed broadcast, or broadcast groups,
and transmit the Data-Link Layer Type-B packets.

*FIG. 7A-1*

| FIG. 7A-1 | FIG. 7A-2 | FIG. 7A-3 | FIG. 7A-4 |
|---|---|---|---|
|  |  |  |  |

Key To
*FIG. 7A*

If (Network Layer router in Data-Link Layer Type-C environment detects network layer packet having as
    a destination a network layer entity in Data-Link Layer Type-B environment) and (network layer router
    detects received network layer packet indicates multicast or broadcast transmission)
then
   address one Data-Link Layer Type-C packet to the one destination data-link layer Type-C address in
     compatibility device, where the one destination data-link layer Type-C packet is defined to be associated
     with the multicast, directed broadcast, or broadcast group;
   transmit the Data-Link Layer Type-C packet into the compatibility device;
   compatibility device, upon receipt of the Type-C packet is defined to be associated with the multicast,
     directed broadcast, or broadcast group creates one or more data-link layer type-B packet having
     type-B multicast, directed broadcast, or broadcast groups, as appropriate; and
   transmit the Data-Link Layer Type-B packets.

*FIG. 7B-1*

| FIG. 7B-1 | FIG. 7B-2 | FIG. 7B-3 | FIG. 7B-4 |

Key To
*FIG. 7B*

Key To

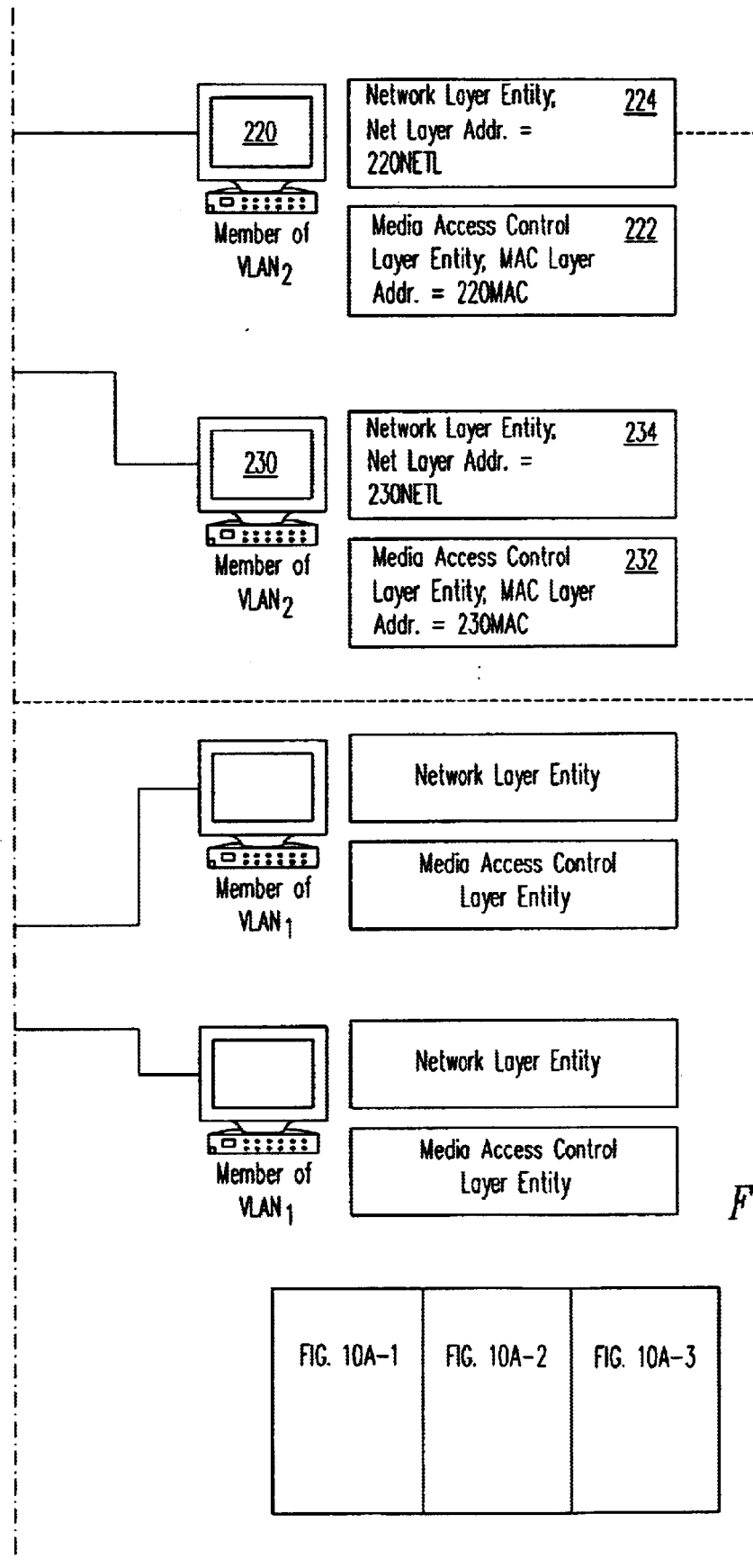

Key To

NETWORK COMPATIBILITY

BACKGROUND OF THE INVENTION

1. Field of the Invention

The present invention is related, in general, to data communications networks.

2. Description of the Related Art

Packet-switched data communications networks are data communications networks that provide individual communication channels between many independent sets of users via the use of packet switching. A packet is a sequence of binary digits that (a) includes data, control signals, and possibly error control signals, (b) is transmitted and switched as a composite whole, (c) is arranged in a specific format, such as a header part and a data part, and (d) may consist of several messages or may be part of a single message. Packet switching is the routing and the transferring of data by means of addressed packets so that (a) a channel is occupied only during the transmission of the packet, and (b) upon completion of the transmission of the packet, the channel is made available for the transfer of other traffic.

Theoretically, packet switched networks exist in a layered hierarchical format, where each "layer" performs set of functions associated with the layer. One example of such layered format is the well-known 7-layer ISO OSI (International Organization for Standardization Open Systems Interconnect) model.

The three lowermost layers of the OSI 7-layer model are the physical layer, the data link layer, and the network layer. OSI layer 1, the physical layer, defines functional electrical signals (e.g., voltages, currents, timing, etc.) associated with putting data onto network media (e.g., fiber optic links or twisted wire pair) and taking data off network media. OSI layer 2, the data link layer, defines functions associated with physically passing data from one node to another (e.g., making sure that data sent from a first node is received at a second node in a substantially error free fashion via defined functions such as error checking and retransmission). OSI layer 3, the network layer, defines functions associated with routing data from one node to another throughout a network (e.g., making sure that data originating at a first node, bound for a second node, where such first and second nodes are separated by many intermediate nodes, correctly traverses the network to arrive at its destination). Examples of OSI layer 3 protocols are (IP) internet protocol, IPX (internetwork packet exchange protocol), and AppleTalk protocol.

The ISO OSI 7-layer model was created to allow interoperability across competing vendors (i.e., to allow the creation and use of "open" systems where many different vendors products can be used to construct a network, in contradistinction to proprietary or "closed" systems which are dependent upon one vendor). If the parameters laid down in the OSI 7-layer model are strictly followed, the foregoing layered approach will provide such interoperability, or open systems.

Unfortunately, in practical application, even when data communications networking vendors and systems engineers have tried to follow the defined OSI 7-layer open systems model, true interoperability has not generally been achieved. For example, three of the protocols most commonly used to provide OSI layer 2 services—Ethernet, HDLC (High-Level Data Link), and PPP (Point-to-Point) protocols—are generally physically incompatible (e.g., the construction and arrangement of the packet headers are done differently) and logically incompatible (e.g., the protocols provide different services; for example Ethernet provides unicast, multicast, and broadcast transmission of data-link layer packets while HDLC only supports unicast transmission of data-link layer packets).

From a practical standpoint, the physical and logical incompatibilities of OSI layer 2 products (e.g., Ethernet or other products used in an OSI layer 2 fashion which provide OSI layer 3 services) by the systems engineers to support OSI layer 3 services substantially ensures that the OSI network layer 3 entities which are compatible with each other cannot communicate with each other if such OSI layer 3 network entities are installed and run in networks providing incompatible OSI layer 2 environments. For example, a first group of OSI layer 3 entities running in an OSI layer 2 Ethernet environment cannot generally communicate with a second group of entities running the same OSI layer 3 protocol, when the second group is running in an OSI layer 2 HDLC environment, due to the physical and/or logical incompatibilities between Ethernet and HDLC. As another example, a first group of OSI layer 3 entities running in an OSI layer 2 Ethernet environment cannot generally communicate with a second group of entities running the same OSI layer 3 protocol, when the second group is running in an OSI layer 2 PPP environment, due to the physical and/or logical incompatibilities between Ethernet and PPP.

It has been recognized by the inventors named herein (inventors), and such recognition forms part of the inventive content herein, that a need exists for a method and system to correct the damage to the open systems concept which has arisen from the foregoing-noted incompatibilities between different implementations of OSI layer 2. It has also been recognized by the inventors, and such recognition forms part of the inventive content herein, that the method and system should be essentially transparent to existing OSI layer 2 and layer 3 entities so that significant redesign of existing systems need not occur.

SUMMARY OF THE INVENTION

In one embodiment, a method for improving network compatibility includes but is not limited to the following: receiving a first-protocol data-link layer packet having a first-protocol address, the first-protocol data-link layer packet encapsulating a network-layer packet bound for a network layer entity native to a second-protocol data-link layer environment; directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address; and transmitting the at least one second-protocol data-link layer packet into the second-protocol data-link layer environment. In other embodiments, hardware and/or software effect the foregoing referenced method.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE DRAWINGS

Figure 1:
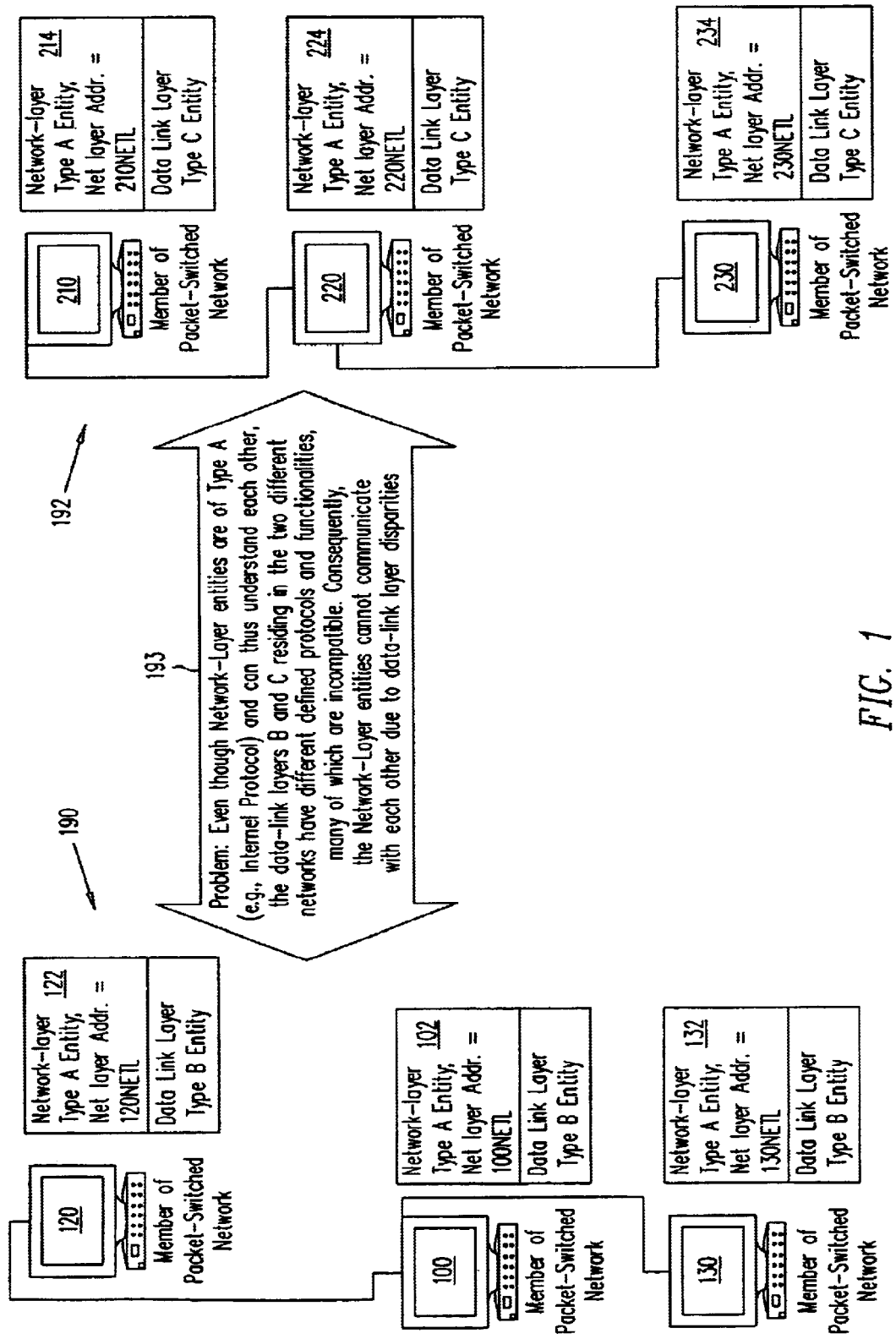
FIG. 1 shows a partial view of 2 packet-switched networks 190, and 192.
Figure 2A:
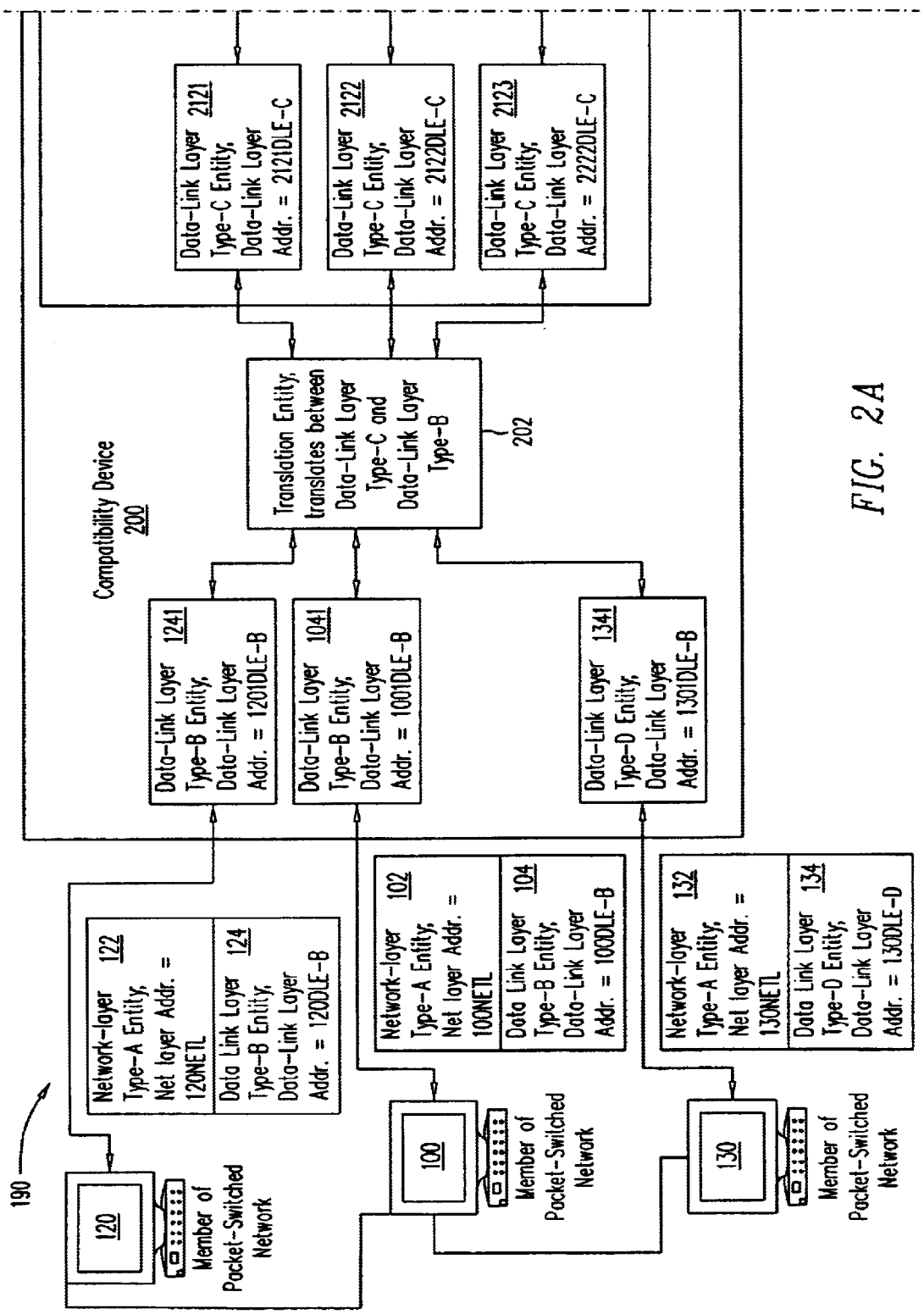
FIG. 2 depicts that compatibility device 200 has been interposed between packet-switched network 192 and packet-switched network 190.
Figure 3A:
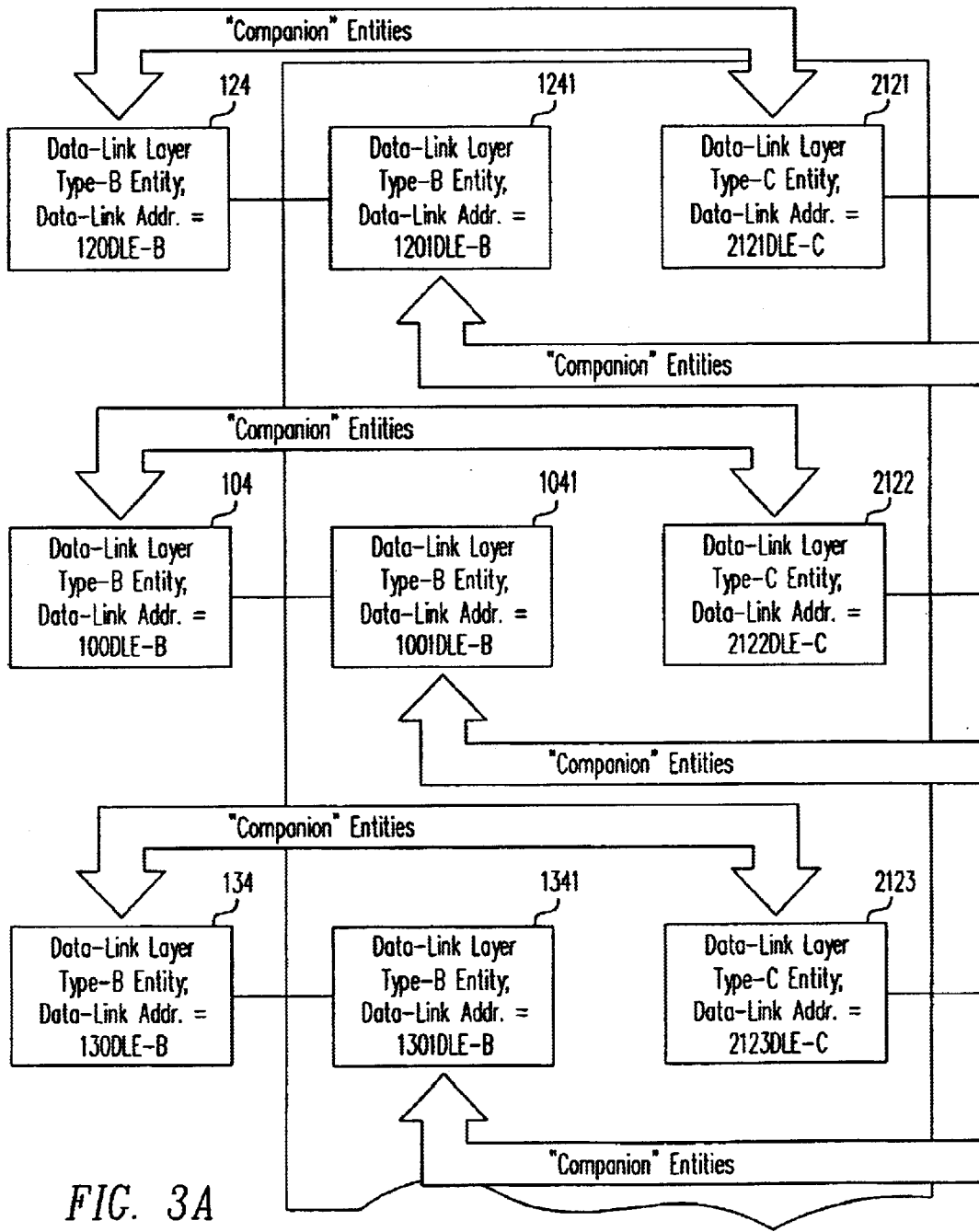
FIG. 3 shows an exploded view of a portion of compatibility device 200 which will be used to demonstrate one embodiment of a strategy utilized by translation devices, such as translation device 202, to provide compatibility between two different networks having incompatible data-link layer protocol environments
Figure 3B:
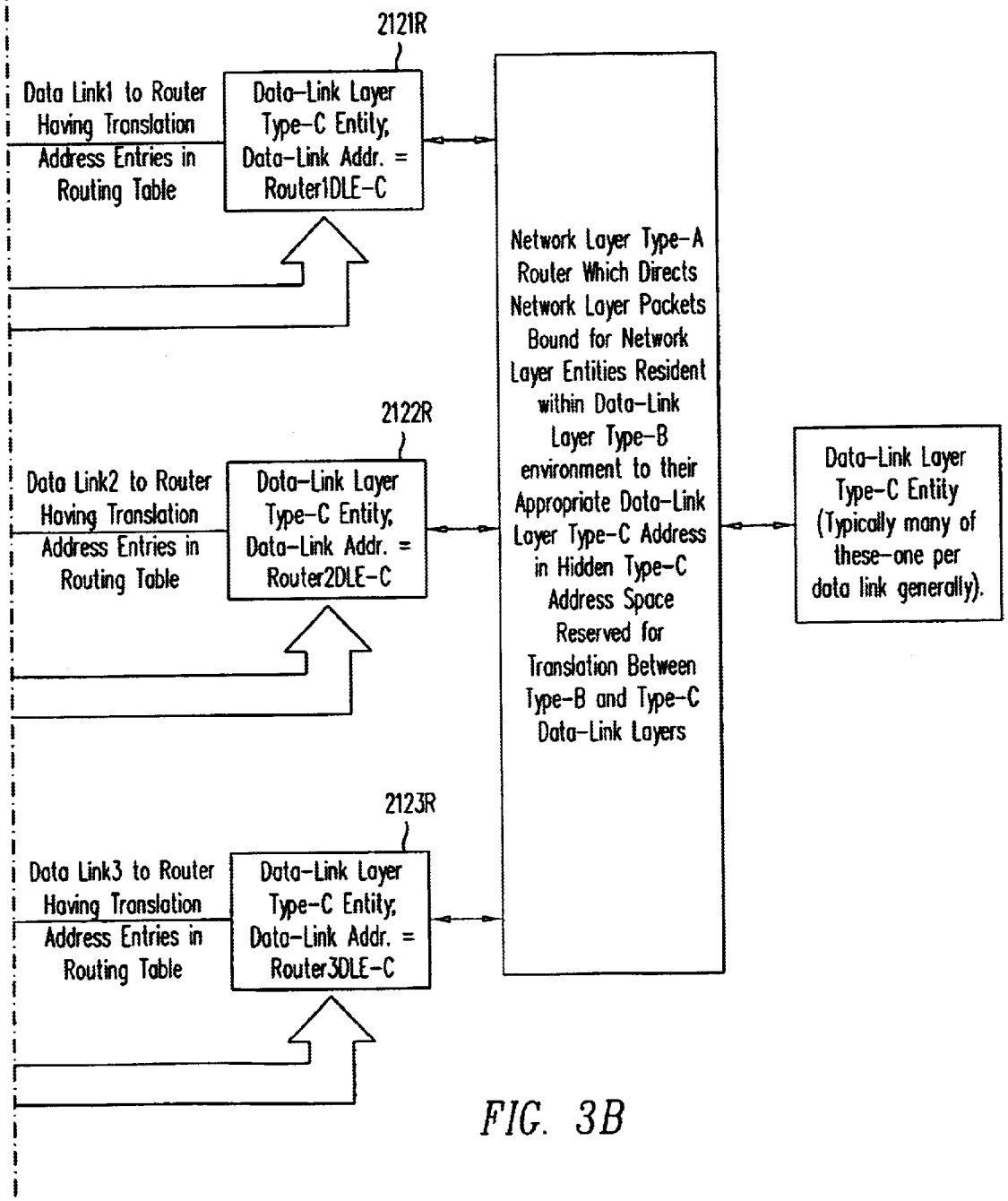
Figure 4A:
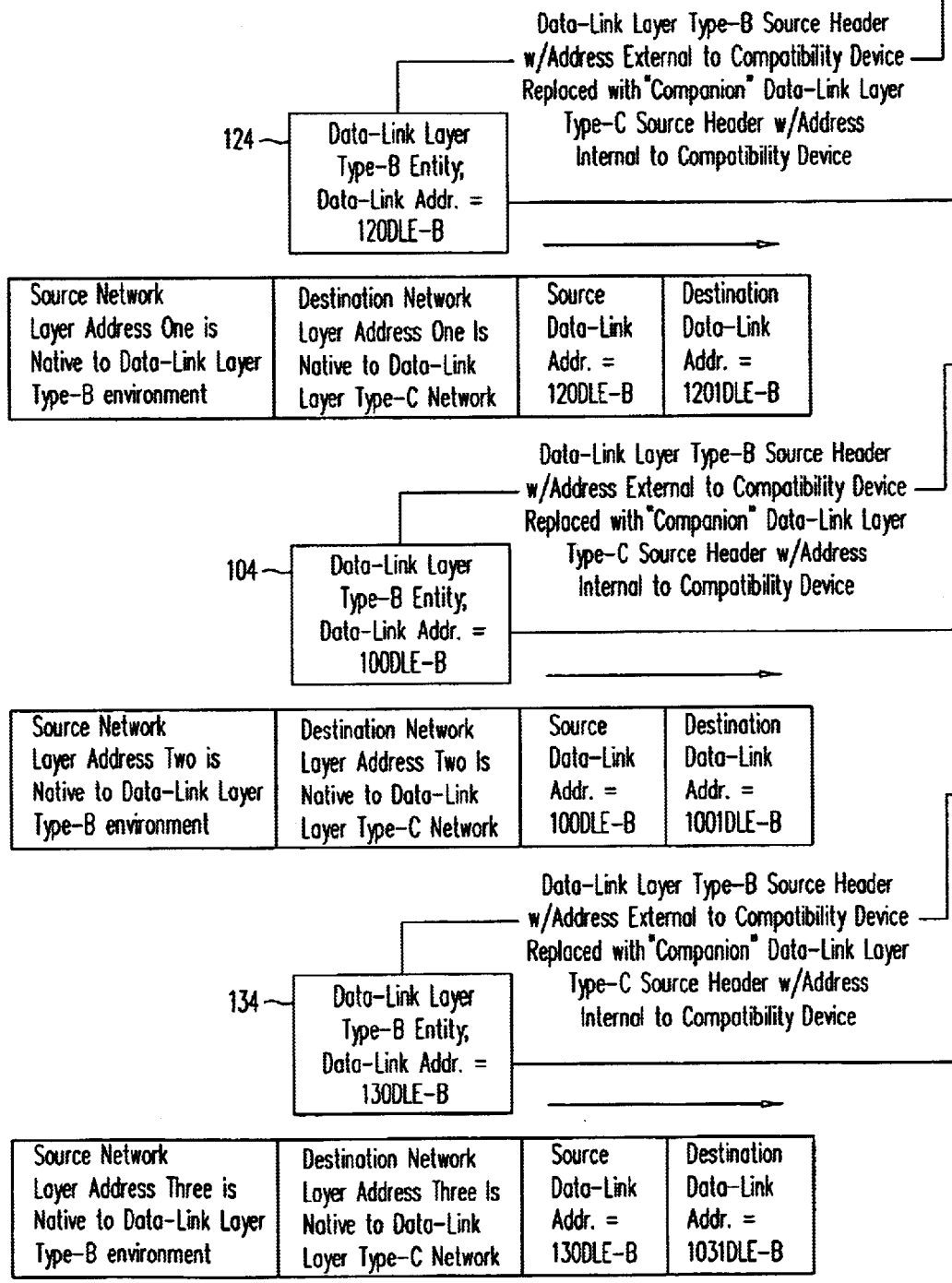
FIG. 4 illustrates how the "companion" data-link layer entity associations external and internal to compatibility device 200, shown in FIG. 3, can be utilized to construct an basic ingress translation strategy for network layer packets bound from a network layer entity native to data-link layer type-B environment to a network layer entity native to data-link layer type-C environment.
Figure 4B:
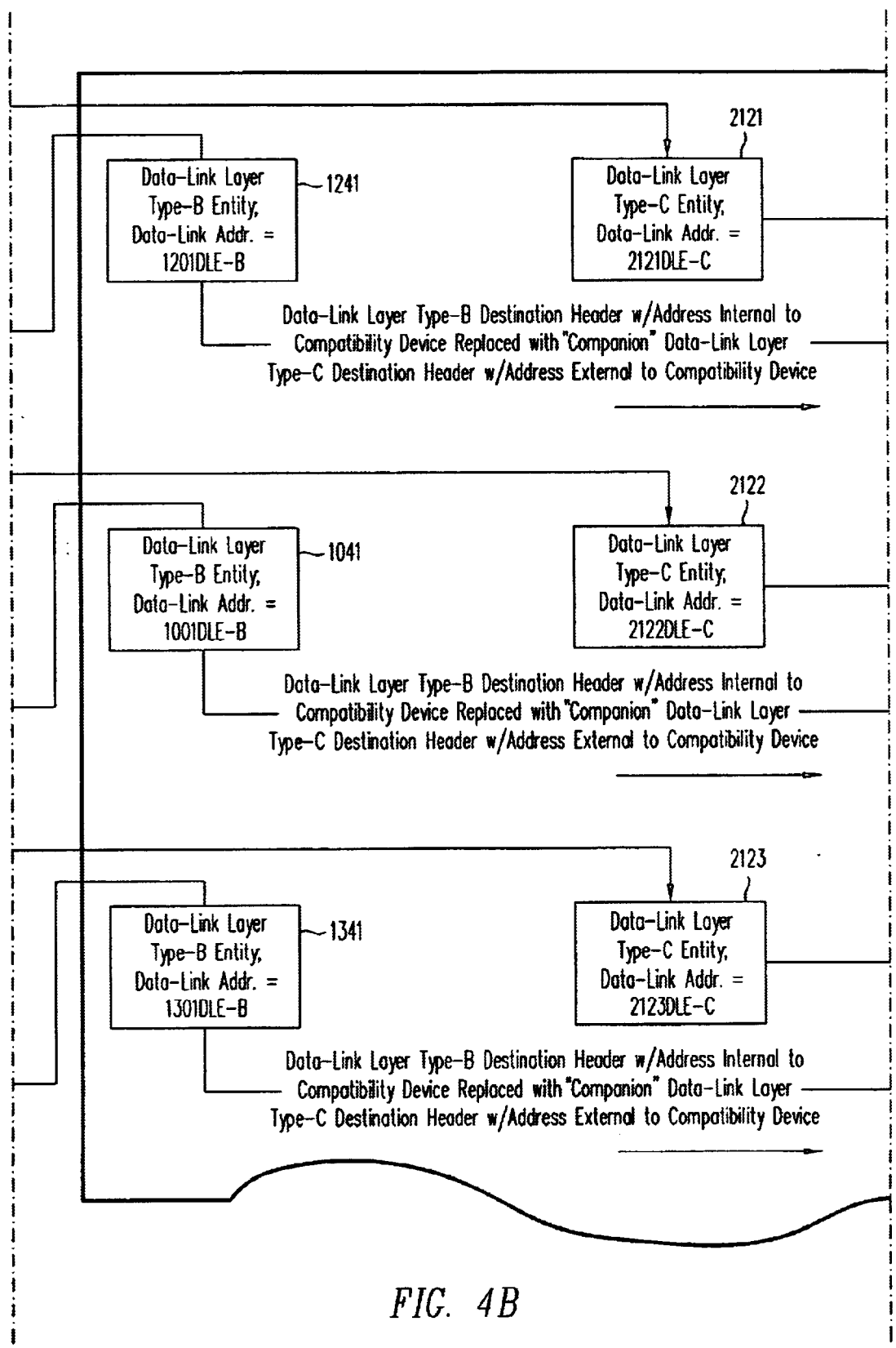
Figure 4C:
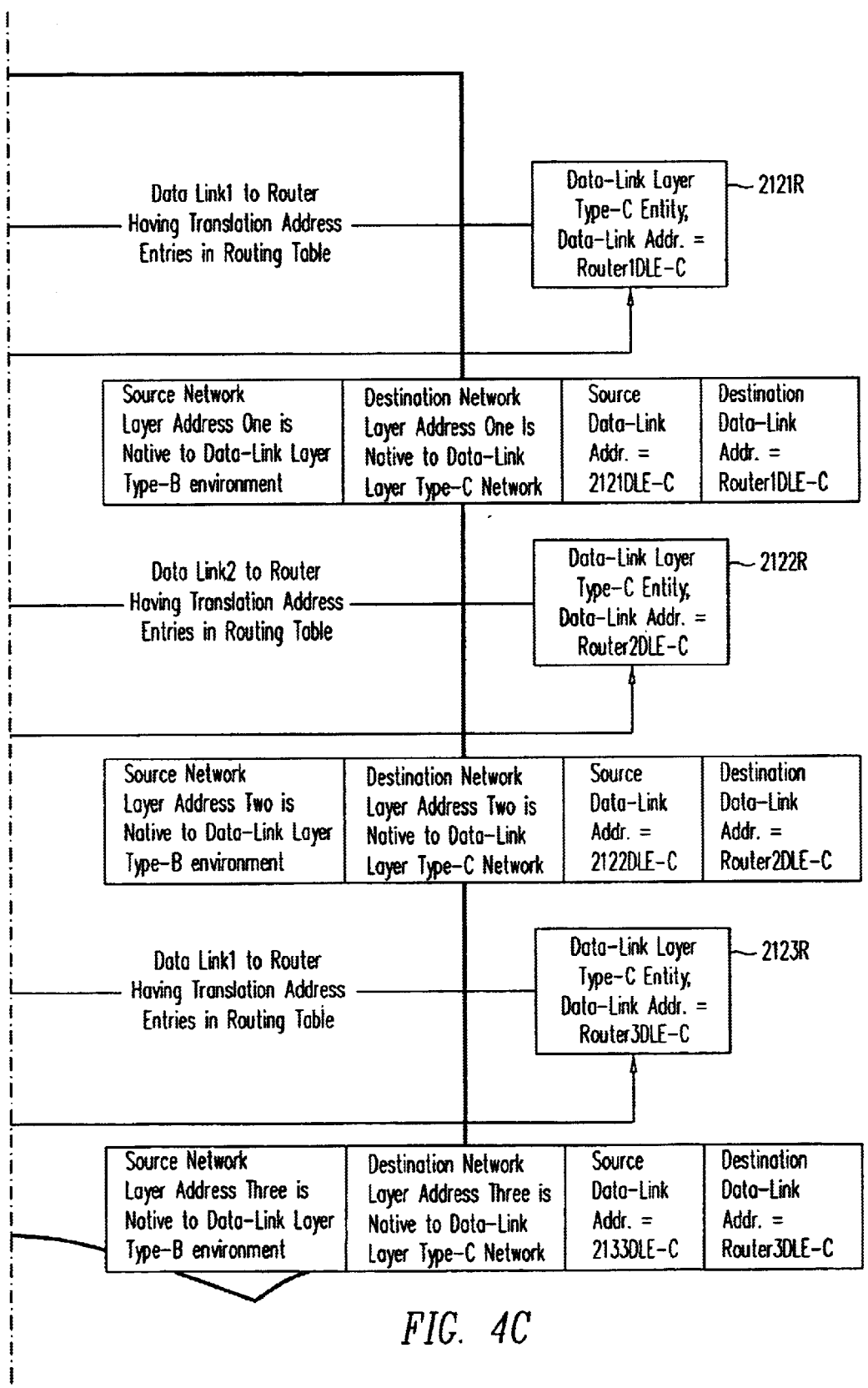

With reference now to FIG. 1, shown is a partial view of 2 packet-switched networks 190, and 192. Packet-switched network 190 is depicted as composed of computer systems 100, 120, and 130 (while only 3 computer systems are shown, packet-switched network 190 is meant to be indicative of a network having any number of computer systems). Illustrated is that computer systems 100, 120, and 130 of packet-switched network 190 respectively employ Network Layer Type-A protocol entities 102, 122, and 132 in a data-link layer type-B protocol environment. Shown is that computer systems 210, 220, and 230 of packet-switched network 192 respectively employ and Network Layer Type-A protocol entities 214, 224, and 234 in a data-link layer type-C protocol environment.

Shown in problem arrow 191 is that the network layer type-A protocol entities 214, 224, and 234 of packet-switched network 192 would like to communicate with the network layer type-A protocol entities 102, 122, and 132 of packet-switched network 190, but are precluded from doing so due to incompatibilities between the protocols and services of data-link layer type-B of packet-switched network 190 and the protocols and services of data-link layer type-C protocols of packet switched network 192.

Figures 2, 7A:
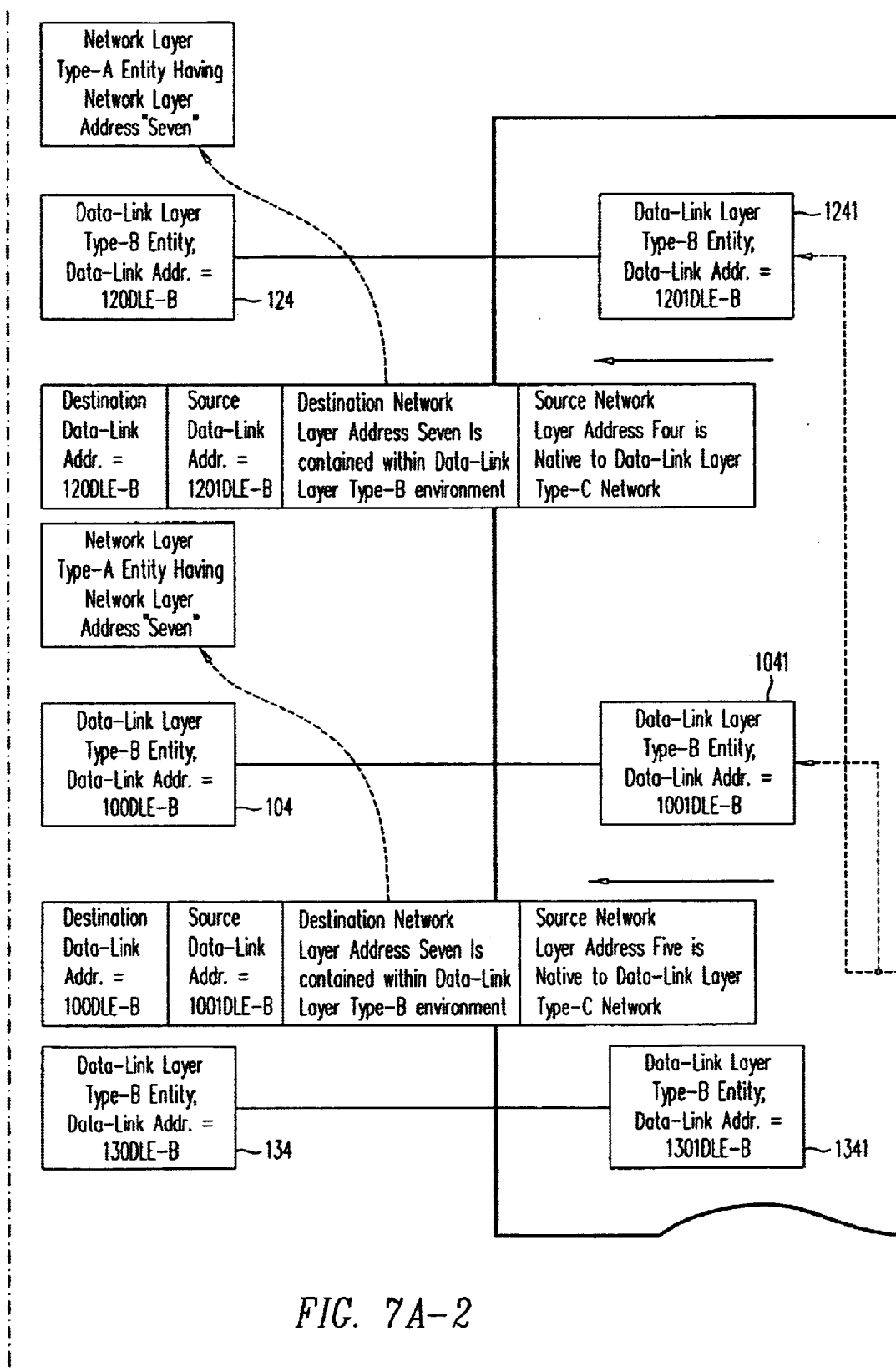
FIGS. 7A and 7B are illustrations representative of multicast, directed broadcast, or broadcast transmission of network layer packets from the data-link layer type-C environment to the data-link layer type-B environment.

With reference now to FIG. 2, depicted is that compatibility device 200 has been interposed between packet-switched network 192 and packet-switched network 190. Compatibility device 200 resolves the compatibility problems arising from the incompatibilities between the various different types of data-link layer protocols being utilized on packet-switched networks 190, and 192.

Shown is that compatibility device 200 provides physical connections for computers 100, 120 and 130 of packet switched network 190 whereby data-link layer type-B entities 124, 104, and 134 can respectively communicate with data-link layer type-B entities 1241, 1041, and 1341. That is, compatibility device 200 makes it appear to Type-B entities 124, 104 and 134 that they are communicating with other Type-B entities.

Depicted is that data-link layer type-B entities 1241, 1041, and 1341 feed into translation entity 202. Translation entity 202 accepts ingressing (incoming) data-link layer type-B packets and creates one or more data-link layer type-C packets and then releases those one or more created data-link layer type-C packets into packet-switched network 192. The number of data-link layer type-C packets that will be created will vary dependent upon the relative capabilities of the data-link layer type-B and type-C protocols and the type of transmission indicated by the data-link layer type-B packet received.

Translation entity 202 also accepts egressing (outgoing) data-link layer type-C packets and creates one or more data-link layer type-B packets and then releases those one or more created data-link layer type-B packets into packet-switched network 190. The number of data-link layer type-B packets that will be created will vary dependent upon the relative capabilities of the data-link layer type-C and type-B protocols and the type of transmission indicated by the data-link layer type-B packet received.

With respect to FIG. 2, shown is that the data-link layer type-C address associated with compatibility device 200 is "hidden." The reason for this is that part of the processes and devices associated with the translation of the data-link layers involves programming a network router in the data-link layer type-C environment of packet-switched network 192 to recognize network layer packets destined for network layer entities in the data-link layer type-B environment of packet-switched network 190. Accordingly, in one embodiment a data-link layer type-C address space allowing for transmission from switch/router 220 of packet-switched network 192 is reserved, or "hidden," or cannot be utilized by other entities within data-link layer type-C environment packet-switched network 192.

Figures 3, 7A:
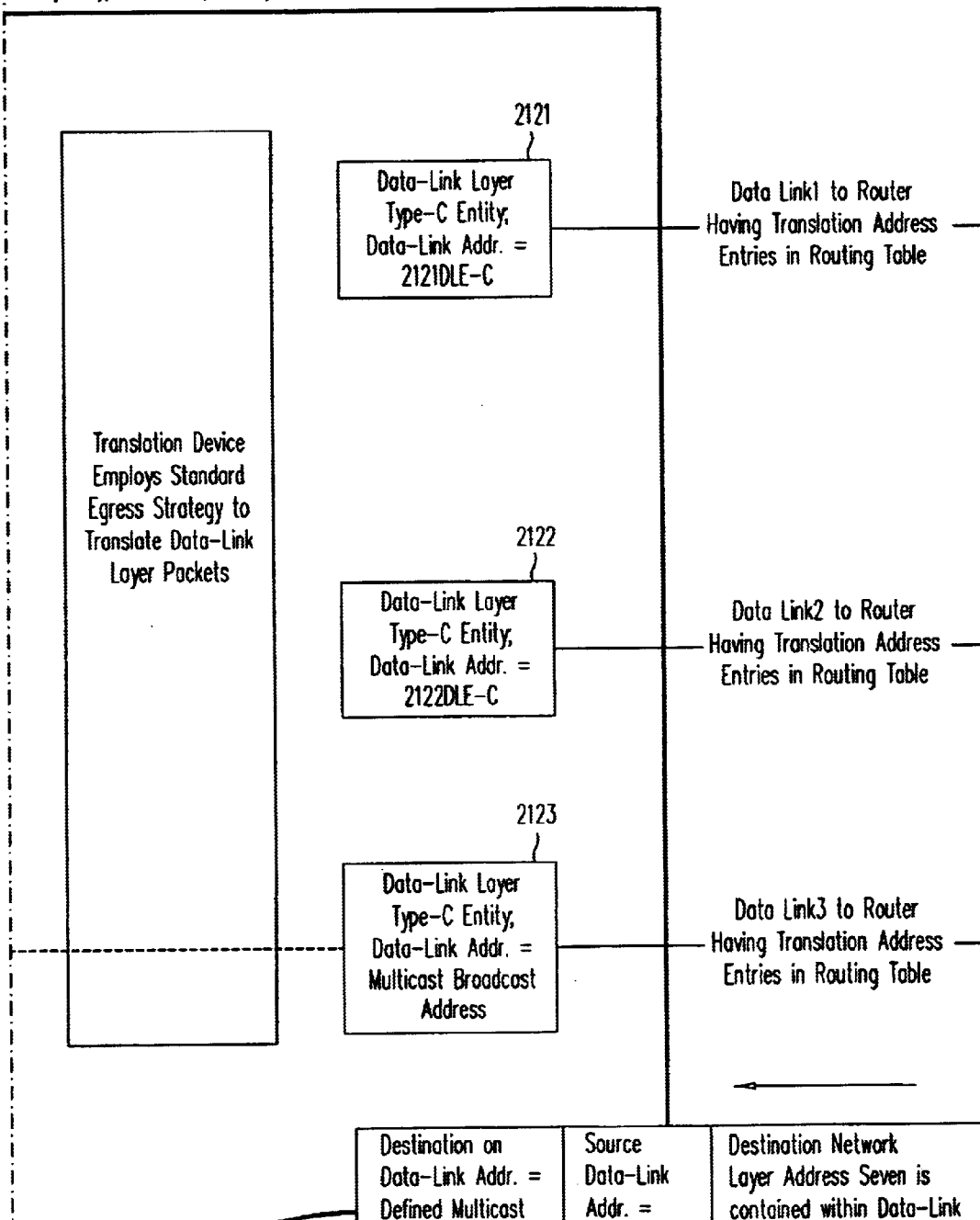

With reference now to FIG. 3, shown is an exploded view of a portion of compatibility device 200 which will be used to demonstrate one embodiment of a strategy utilized by translation devices, such as translation device 202, to provide compatibility between two different networks having incompatible data-link layer protocol environments, (e.g., make data-link layer type-C environment compatible with data-link layer type-B environment and vice versa). Notice that, as shown on FIG. 4, (1) Compatibility Device 200 is structured such that each data-link layer type-B Entity internal to Compatibility Device 200 has a "companion" data-link layer type-C Entity internal to Companion Device 200 (and vice versa); (2) data-link layer type-C Entities 2121, 2122, 2123 internal to Compatibility Device 200 are connected, via data links, with "Companion" Data Link Layer Type-C Entities 2121R, 2122R, 2123R external to Compatibility Device 200; and (3) data-link layer type-B Entities 1241, 1041, 1341 internal to Compatibility Device 200 are connected, via data links, with "Companion" Data Link Layer Type-B entities 124, 104, 134 external to Compatibility Device 200.

The foregoing described logical "companion" relationships between the various data-link layer entities can be used to provide a scheme utilized by translation entity 202 to provide compatibility between data-link layer type-C protocol and data-link layer type-B protocol environments when such environment are logically and/or physically incompatible. For example, in a situation where the data-link layer type-B protocol environment is either HDLC or PPP, and the data-link layer type-C protocol environment is either Token-Ring or Ethernet LAN protocol. As will be shown, the logical "companioning" of FIG. 3 can be utilized to create a basic ingress and egress strategy sufficient to make compatible unicast transmissions between the type-B and type-C environments. In addition, as will be shown, the described basic ingress and egress strategies can be augmented by grouping strategies employing switch/router 220 in order to extend the basic egress transmission strategy such that multicast, broadcast, and directed broadcast transmissions may be performed. Embodiments of the described basic ingress and egress strategies are demonstrated in FIGS. 4 and 5.

Figures 4, 7A:
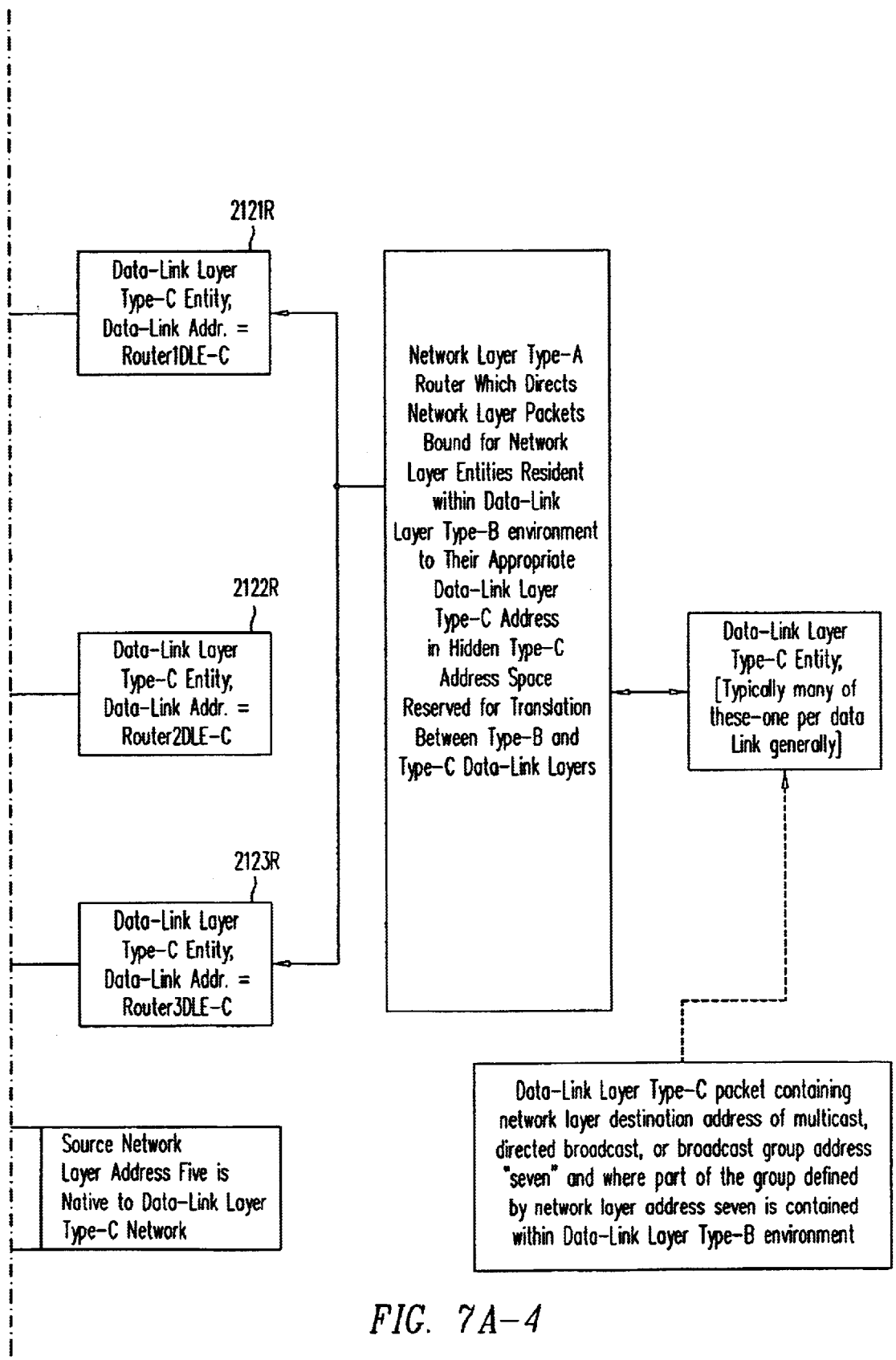

Referring now to FIG. 4, shown is how the "companion" data-link layer entity associations external and internal to compatibility device 200, shown in FIG. 3, can be utilized to construct an basic ingress translation strategy for network layer packets bound from a network layer entity native to data-link layer type-B environment (e.g., network layer entity 122 in packet-switched network 190) to a network layer entity native to data-link layer type-C environment (e.g., network layer entity 224 in packet-switched network 192). Depicted is that for each data-link layer type-B packet received into the compatibility device, (1) the data-link layer type-B destination header address (e.g., 1201DLE-B) of the data-link layer type-B entity (e.g., data-link layer entity 1241) internal to Compatibility Device 200 is replaced with the data-link layer type-C packet destination address (e.g., Router1DLE-C) of the "Companion" data-link layer Type-C entity (e.g., data-link layer type-C entity 2121R) external to Compatibility Device 200, and (2) the data-link layer type-B source header address (e.g., 120DLE-B) of the data-link layer type-B entity (e.g., data link layer entity 124) external to compatibility device 200 is replaced with the data-link layer type-C packet source address (e.g., 2121DLE-C) of the "Companion" data-link layer type-C entity (e.g., data-link layer entity 2121) internal to Compatibility Device 200. Thereafter, the resultant data-link layer type-C packet is transmitted to switch/router 220, which thereafter routes the packet to the appropriate location within the confines of packet-switched network 192. One high-utility aspect of the foregoing scheme is the functioning of compatibility device 200 is completely transparent to network layer entities and data-link layer entities and data-link layer type-B and Type-c entities external to compatibility device 200. ==Further referring to FIG. 4, note that in the unusual case in which data-link layer type-B does not have unique data link layer addressing (e.g., when data-link layer type-B protocol is PPP (point-to-point protocol)), the logical companionings referenced in FIG. 4 still hold; however, in this case, since all data-link layer type-B packets received look the same, compatibility device 200 needs another mechanism to determine which "pair" of data link layer type-B entities (e.g., the "pair" data-link layer type-B entities 124 and 1241) should be associated with the received data-link layer type-B packet. In one embodiment, compatibility device 200 achieves this by examining the network source header to discern which "pair" of data-link layer type-B entities should be associated with the received data link layer type-B packet. For example, referring to FIG. 2 and FIG. 4, if the received data-link layer type-B packet has within it a network layer type-A packet having network layer address 120NETL, it is known that the data-link layer type-B packet should be associated with the "paired" data-link layer entities 124 and 1241 (since data-link layer type-B entity 124 is coresident with the network layer entity having address 120NETL). Thereafter, once this correct data link layer type-B entity pairing has been determined, the "companioning" of this FIG. 4 can be utilized to make the appropriate header substitutions to the received data-link layer type-B packet.

Figure 5A:
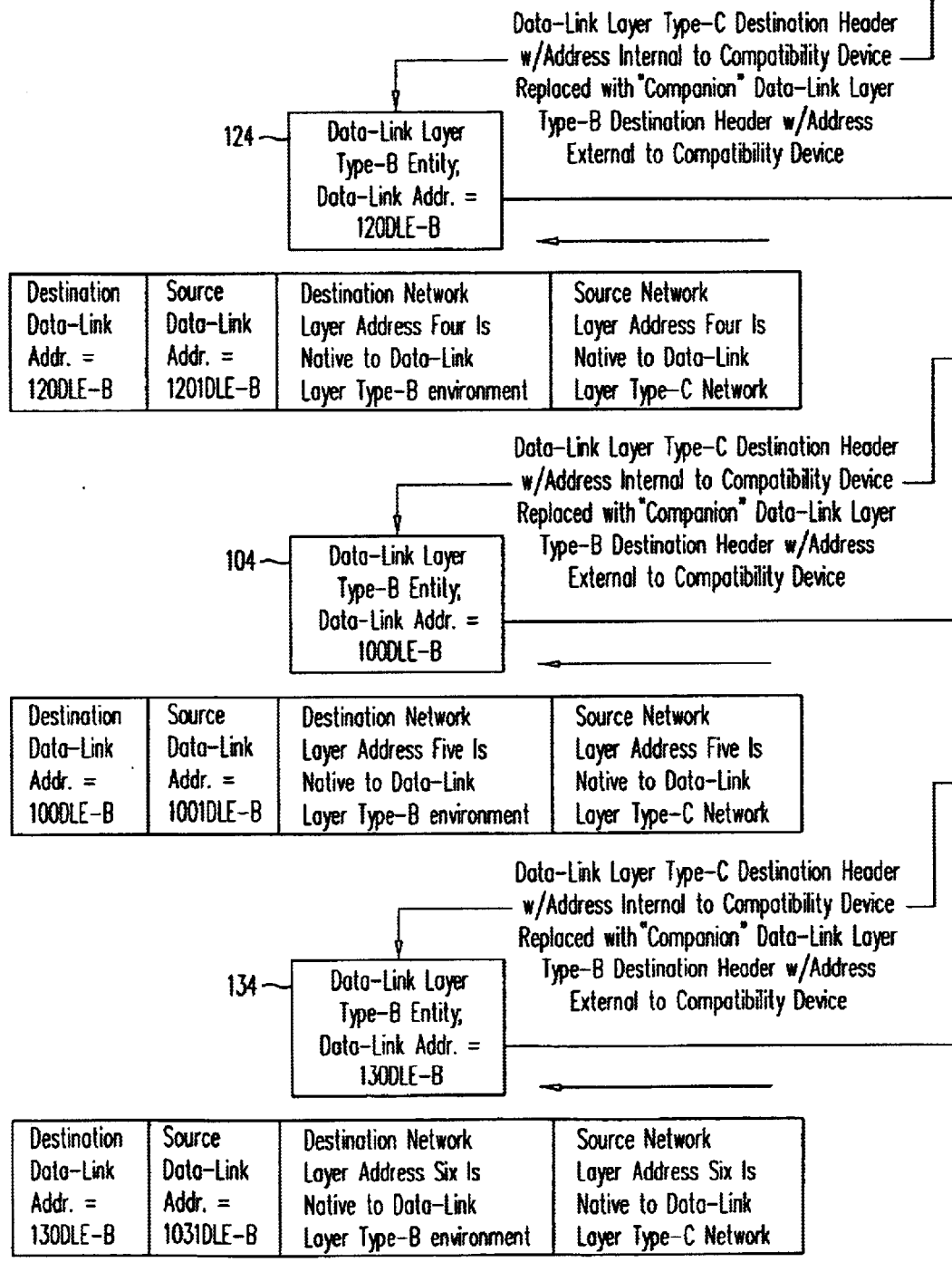
FIG. 5 depicts how the "companion" data-link layer entity associations external and internal to compatibility device 200, shown in FIG. 3, can be utilized to construct a basic egress translation strategy for network layer packets from a network layer entity native to the data-link layer type-C environment to a network layer entity native to a data-link layer type-B environment.
Figure 5B:
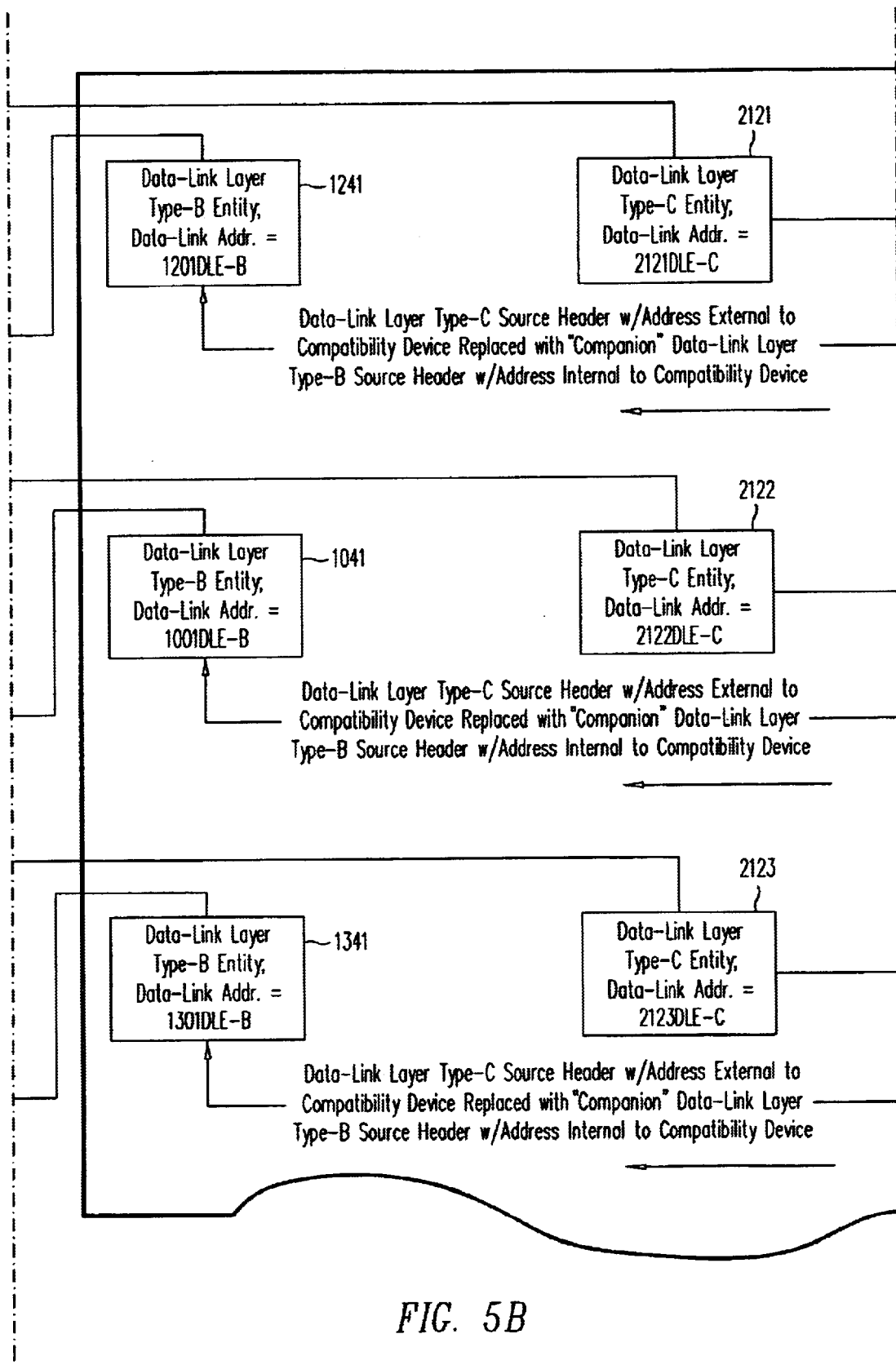
Figure 5C:
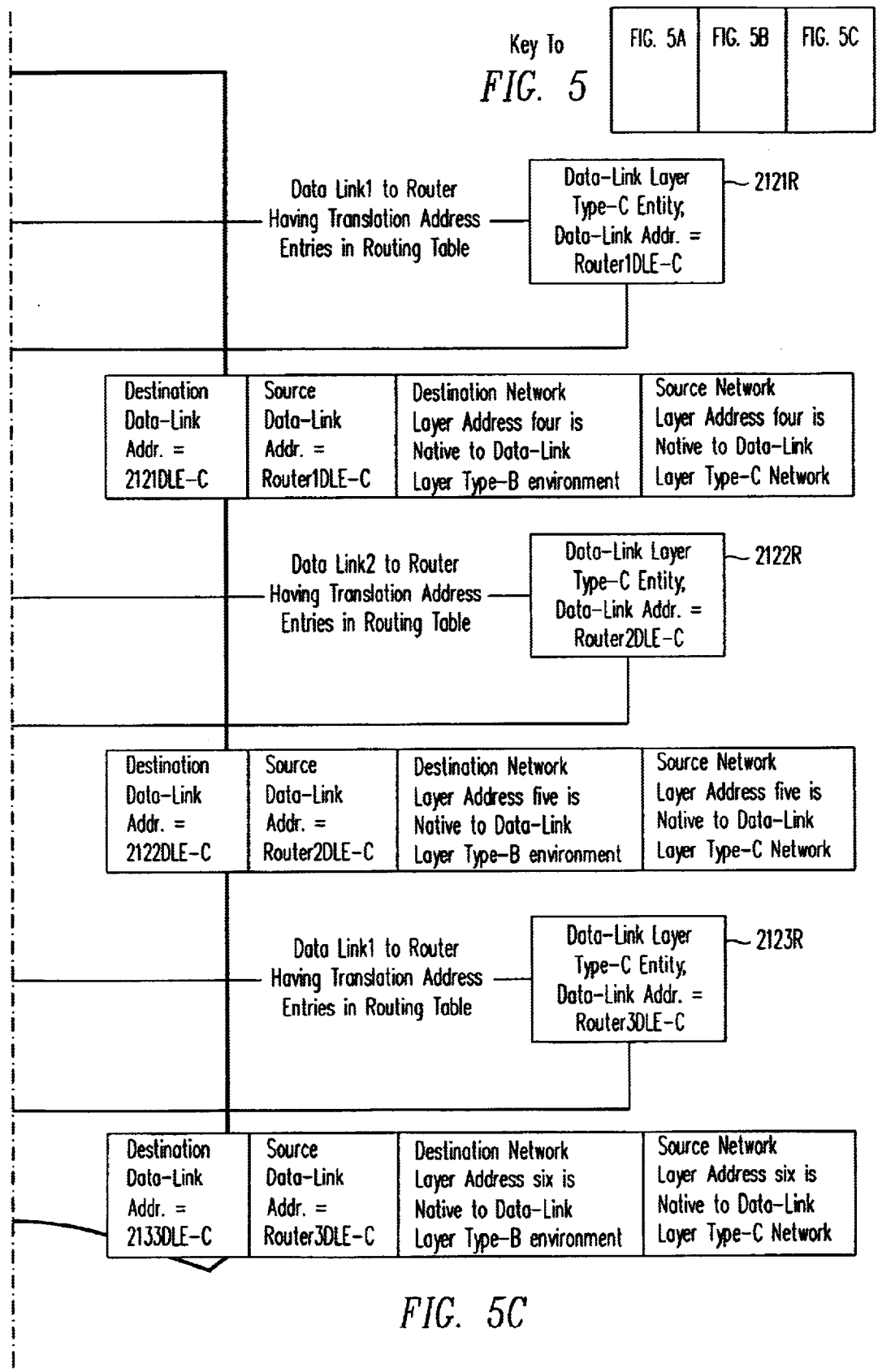

With reference now to FIG. 5, shown is how the "companion" data-link layer entity associations external and internal to compatibility device 200, shown in FIG. 3, can be utilized to construct a basic egress translation strategy for network layer packets from a network layer entity native to the data-link layer type-C environment to a network layer entity native to a data-link layer type-B environment. Depicted is that for each data-link layer type-C packet received into compatibility device 200, (1) the data-link layer type-C packet destination header address (e.g., 2121DLE-C) of the data-link layer type-C entity (e.g., data-link layer type-C entity 2121) internal to Compatibility Device 200 is replaced with a data-link layer type-B packet destination address (e.g., 120DLE-B) of the "Companion" data-link layer type-B entity external to Compatibility Device 200, and (2) data-link layer type-C source header address (e.g., Router1DLE-C) of the data-link layer type-C entity (e.g. data-link layer type-C entity 2121R) external to Compatibility Device 200 is Replaced with a "Companion" data-link layer type-B packet address (e.g., 1201DLE-B) of the data-link layer type-B entity (e.g., data-link layer type-B entity 1241) internal to Compatibility Device 200. Thereafter, compatibility device 200 transmits the resultant data-link layer typeType-B packet into the data-link layer typeType-B environment. One high-utility aspect of the foregoing scheme is the functioning of compatibility device 200 is completely transparent to network layer entities and data-link layer entities and data-link layer type-B and Type-C entities external to compatibility device 200.

Figure 6B:
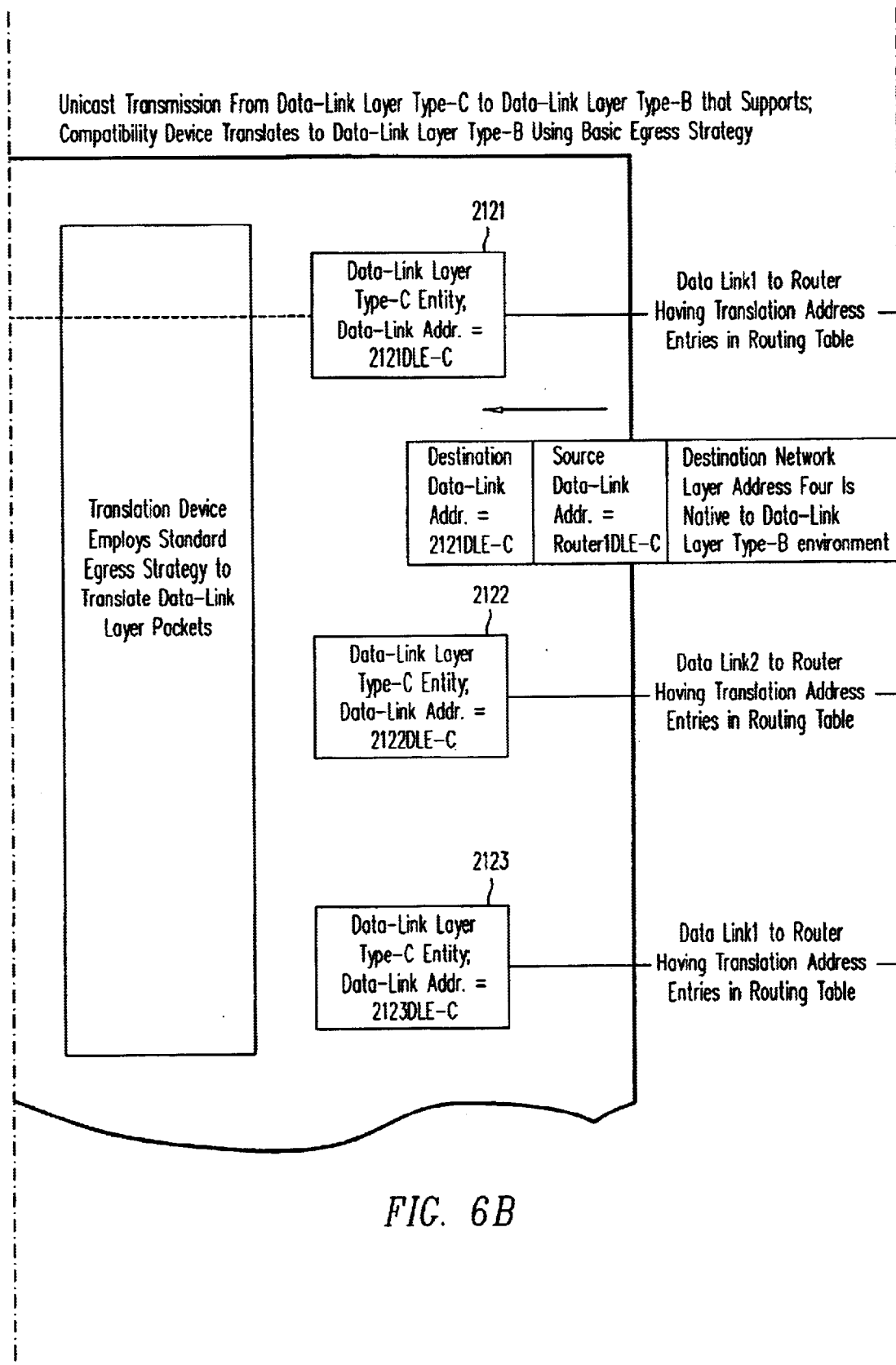
FIG. 6 illustrates transmission of network level unicast packets from a source network entity in a data-link layer type-C environment to a destination network layer entity in a data-link layer type-B environment.
Figure 6C:
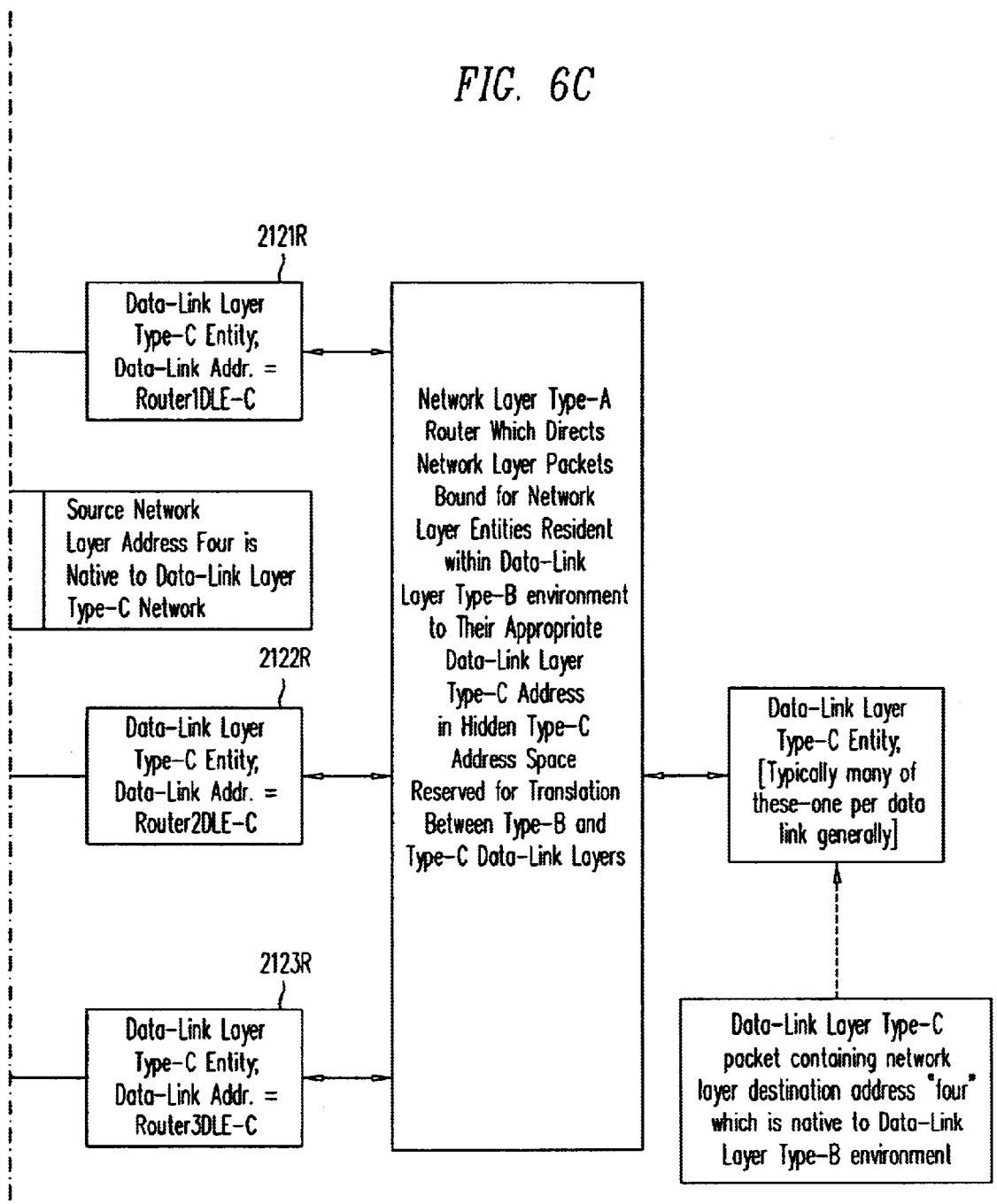
Figure 6:
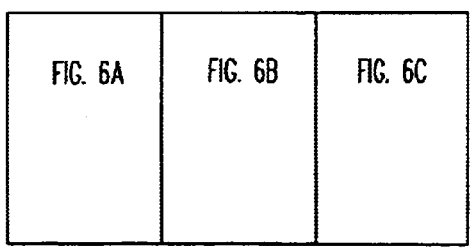

Referring now to FIG. 6, illustrated is transmission of network level unicast packets from a source network entity (e.g., Network Layer entity 224 having network layer address 220NETL) in a data-link layer type-C environment to a destination network layer entity (e.g., network layer entity 122 having network layer address 120NETL) in a data-link layer type-B environment. Shown is that the routing table of switch/router 220 has been set up by the network administrator such that if switch/router 220 in the data data-link layer type-C environment detects network layer packet having as a destination address a network layer entity in data-link layer type-B environment (e.g., network layer address 120NETL) and the network layer router detects the received network layer packet indicates unicast transmission, the network layer router directs that the network layer packet be encapsulated in a data-link layer type-C packet having as a destination data-link layer type-C address the data-link layer type-C address compatibility device most closely companioned with the data-link layer type-B address associated with the desired network layer destination entity (e.g., data link layer type-C address 2121DLE-C), and be transmitted into compatibility device 200. (In one embodiment, if the destination address of the received network layer entity is at a data-link layer type-B entity directly companioned with a data-link layer type-B entity internal to compatibility device 200, the network layer router will address the Type-C data-link layer packet to the Type-C data-link address companioned with the data-link layer type-B entity internal to compatibility device 200. However, if the destination address of the received network layer entity is not at a data-link layer type-B entity directly companioned with a data-link layer type-B entity internal to compatibility device 200, in one embodiment the network layer router will address the type-C data-link layer packet to the type-C data-link address companioned with a data-link layer type-B entity internal to compatibility device 200, which is known to have as a companion a data-link layer type-B entity external to compatibility device 200 wherein a network router resides.) Thereafter, once the data-link layer type-C packet has been so addressed, the data-link layer type-C packet is transmitted to compatibility device 200, which uses the basic egress strategy described in FIG. 4 to translate the packet data-link layer type-C.

Figures 2, 7B:
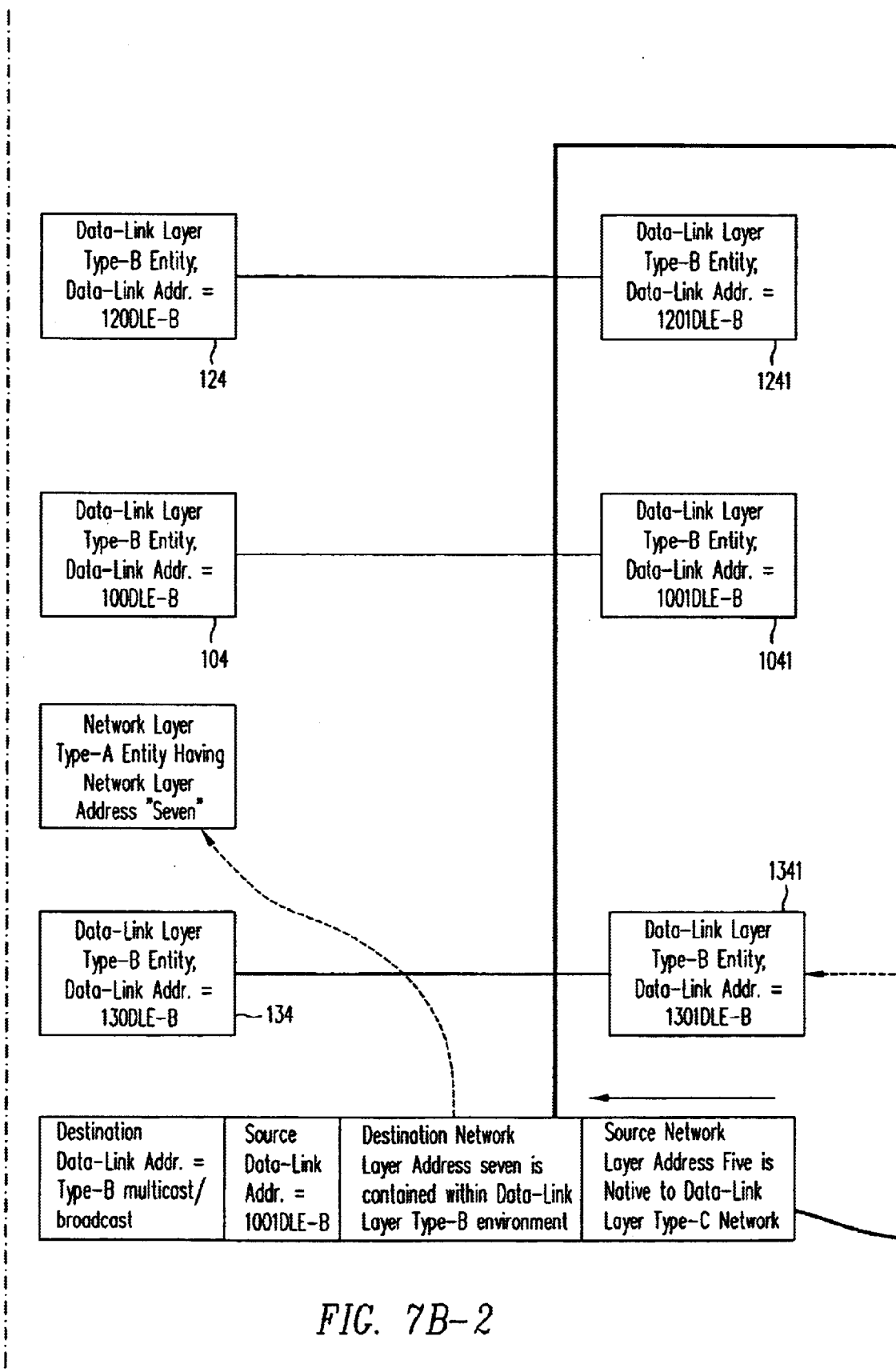
Figures 3, 7B:
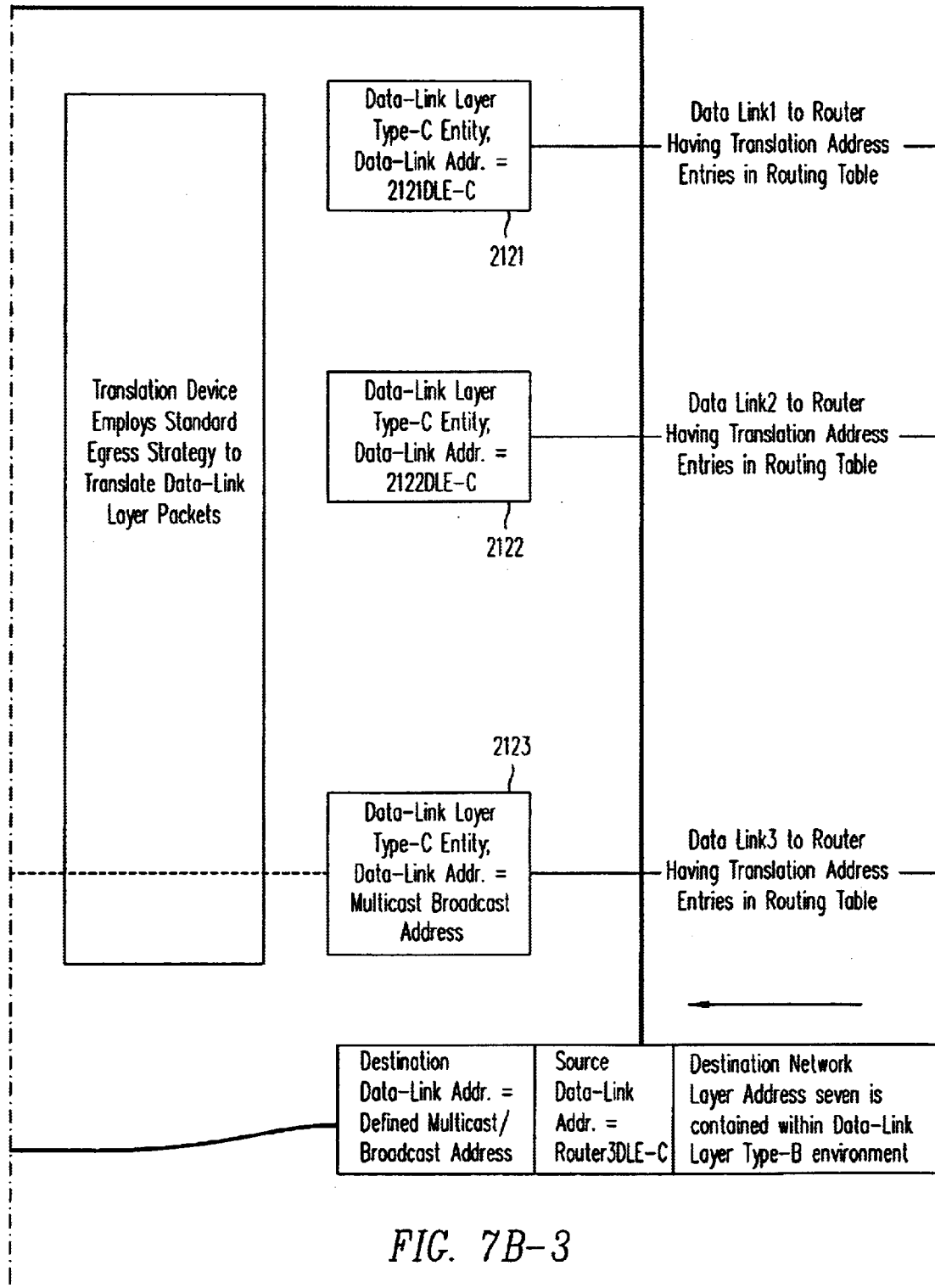
Figures 4, 7B:
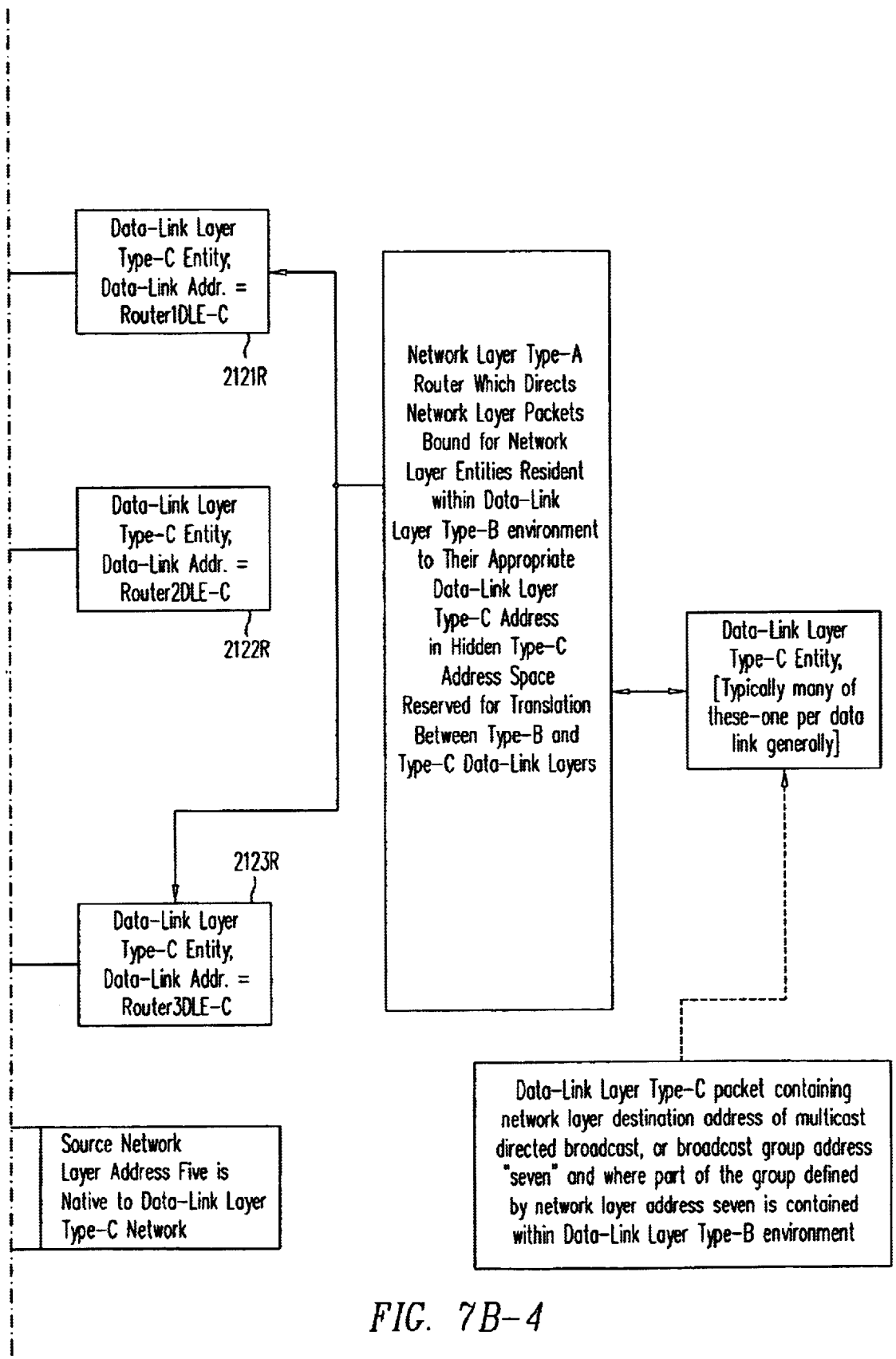

With reference now to FIGS. 7A and 7B, shown are illustrations representative of multicast, directed broadcast, or broadcast transmission of network layer packets from the data-link layer type-C environment to the data-link layer type-B environment. Shown is that if switch/router 220 in the data-link layer type-C environment detects network layer packet (a) indicating multicast, directed broadcast, or broadcast transmission to a group of network layer entities, and (b) one or more destination addresses of the network layer entities in the multicast, directed broadcast, or broadcast group are associated with network layer entities in the data-link layer type-B environment, then switch/router 220 addresses a single data-link layer type-C packet to a single destination data-link layer type-C address within compatibility device 200, where the single destination data-link layer type-C address is an address which that represents a collection of data-link layer type-B addresses associated with the desired one or more network layer destination entities in the defined multicast, multicast, directed broadcast, or broadcast group. Thereafter, switch/router 220 transmits the data-link layer type-C packet into compatibility device 220.

Compatibility device 200, upon receipt of the destination data-link layer Type-C address that represents a collection of data-link layer type-B addresses associated with the desired one or more network layer destination entities in the defined multicast, multicast, directed broadcast, or broadcast group, then generates at least one destination data-link Type-B addresses. As shown in FIG. 7A, if the data-link layer type-B environment only supports unicast, then compatibility device 200 generally creates one or more data-link layer type-B packets (e.g., there will generally be at least two data-link layer type-B packets, but in some special cases a network level multicast/broadcast group may only have one member in the data-link layer type-B environment) having destination addresses associated with the desired one or more network layer destination entities in the defined multicast, multicast, directed broadcast, or broadcast group. Shown is that, in order to create the at least two data-link layer type-B packets, compatibility device 200 then utilizes a modified version of the defined basic egress translation scheme described in FIG. 5; that is, whereas in FIG. 5 the basic egress scheme is one Type-C address to one Type-B address, shown in FIG. 7A is that when translation involves a network layer multicast/broadcast into a data-link layer type-B environment which does not support data-link layer multicast/broadcast, the modified egress scheme involves translating the one data-link layer type-C packet into the data-link layer type-B packets having data link-layer type-B addresses most closely associated with the group. In effect, in such a case, the Type-C destination address associated with mulitcast/broadcast would essentially be "companioned" with the one or more data-link layer type-B entities having network layer members associated with the multicast/broadcast. Thereafter, compatibility device 200 transmits the data-link layer type-C packets into the data-link layer type-B environment of packet-switched network 190.

Referring now to FIG. 7B, shown is that if data-link layer type-B supports multicast/broadcast, then compatibility device 200 utilizes the defined basic egress translation schemed described in FIG. 5 to translate the data-link layer type-C multicast/broadcast packet into the data-link layer type-B multicast/broadcast packet.

Figure 8A:
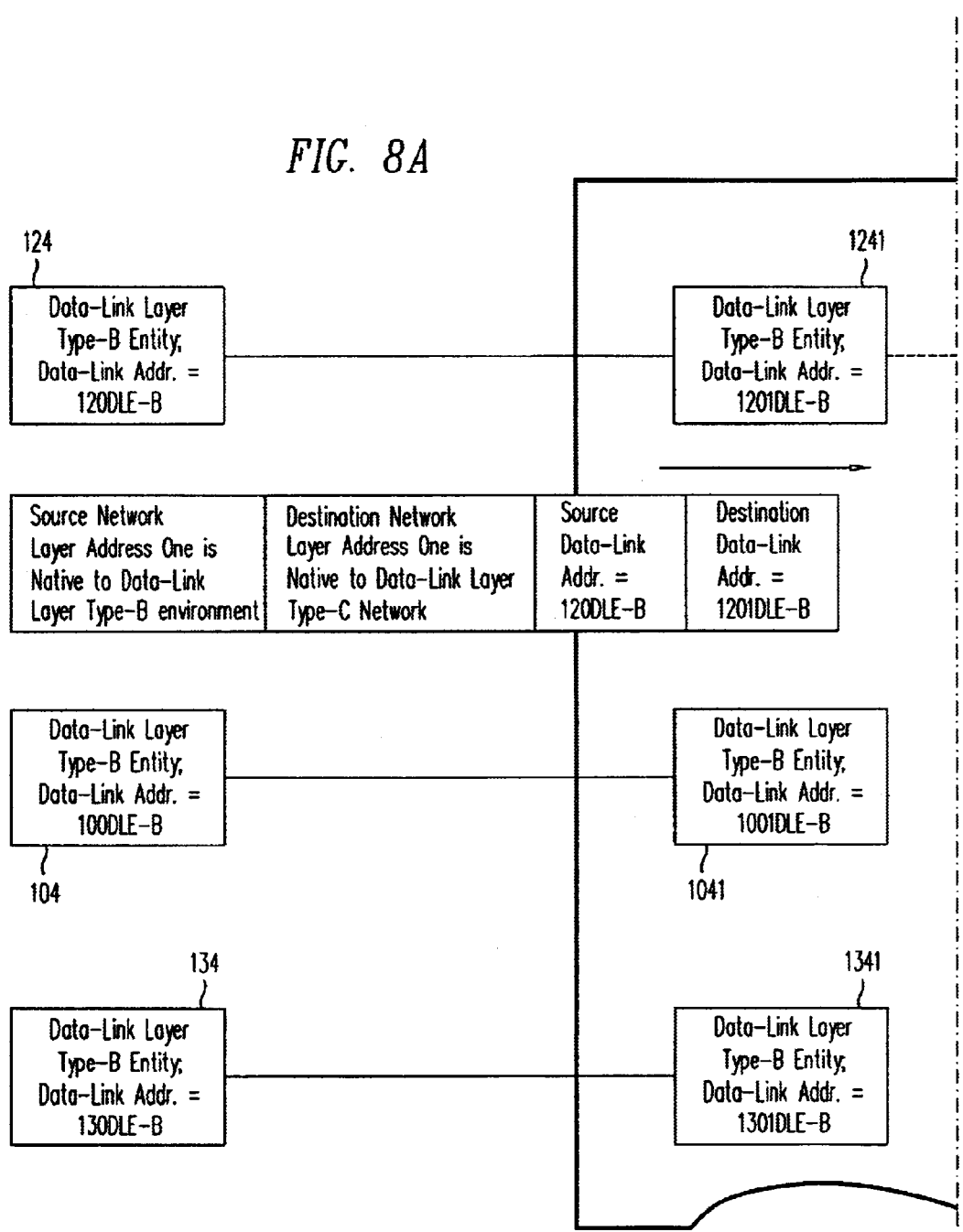
FIG. 8 illustrates receipt and translation of data-link layer type-B packets.
Figure 8B:
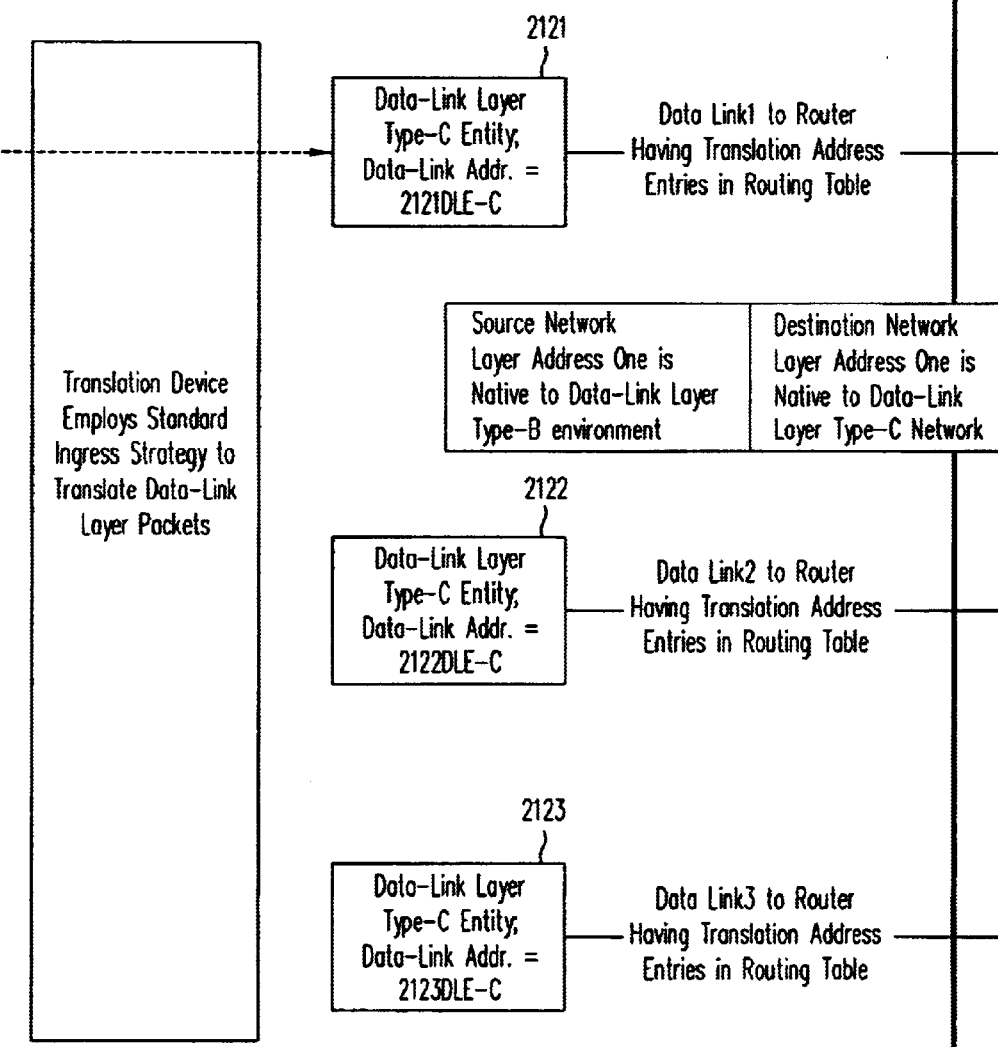
Figure 8C:
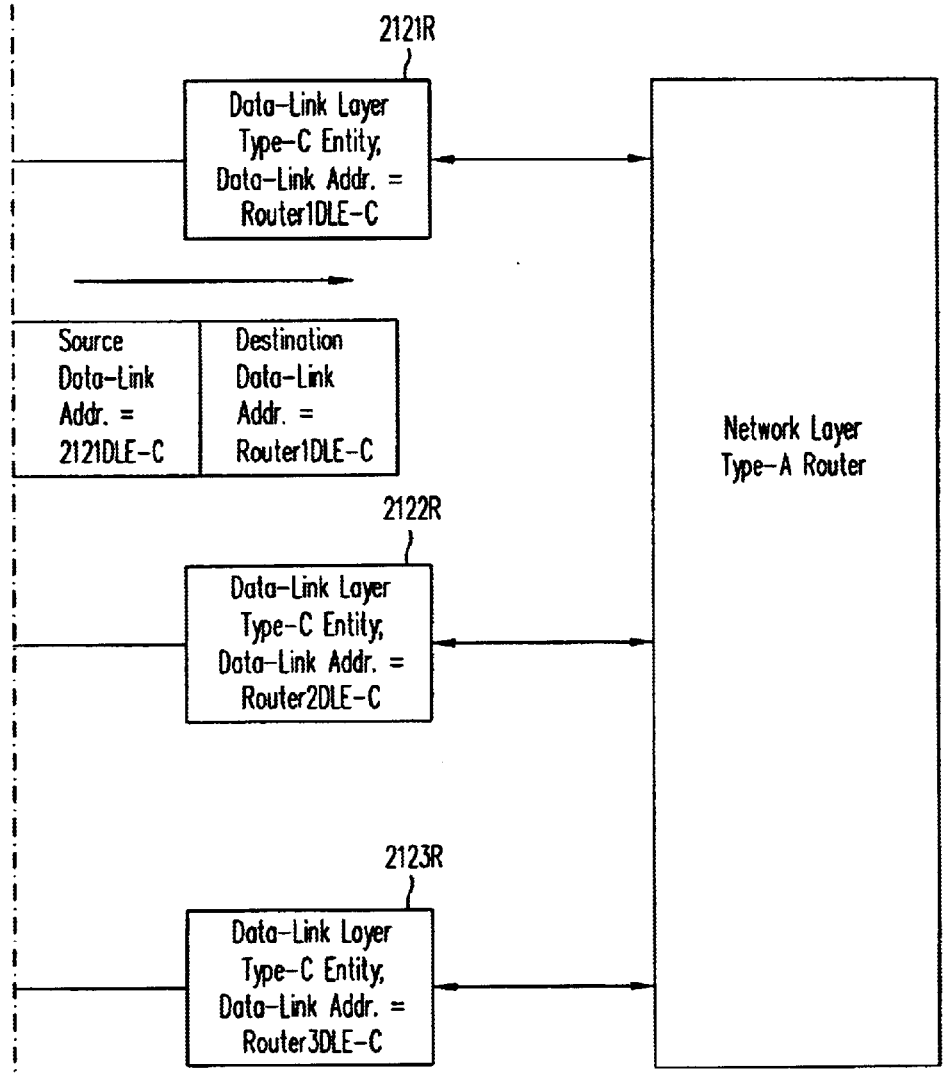

Referring now to FIG. 8, depicted is receipt and translation of data-link layer type-B packets. Illustrated is that if compatibility device 200 receives data-link layer type-B packet addressed to a data-link layer type-B address in compatibility device, then translation entity 202 of compatibility device 200 translates data-link layer type-B packet to data-link layer type-C packet using the standard ingress translation strategy depicted and described in relation to FIG. 3. Thereafter, shown is that compatibility device 200 transmits the data-link layer type-C packet into the data-link lyer type-C environment.

Figures 1, 9A:
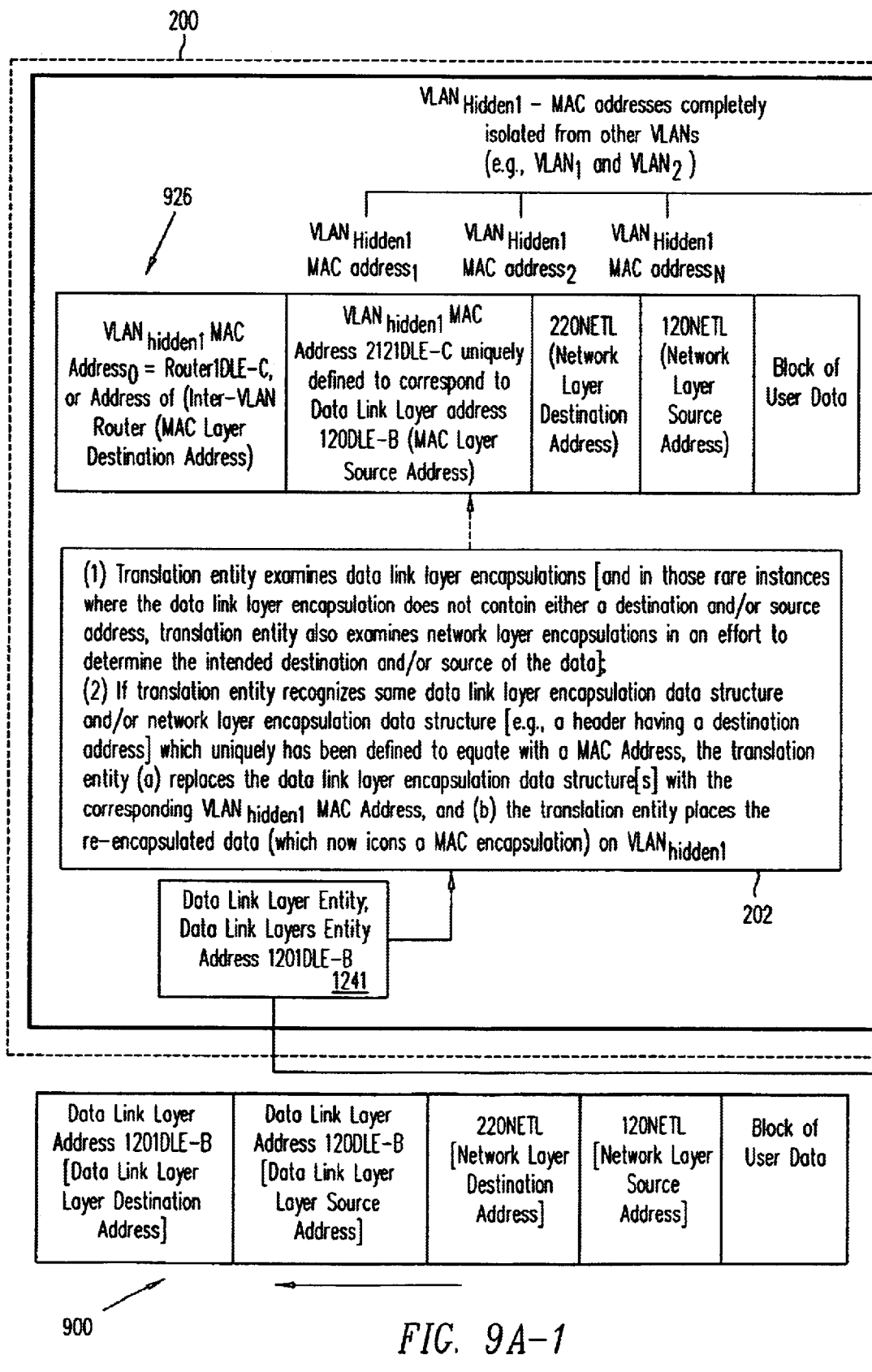
FIGS. 9A and 9B depict an embodiment of the processes and devices illustrated above, where the data-link layer type-C environment is shown as an Ethernet protocol environment.
Figures 2, 9A:
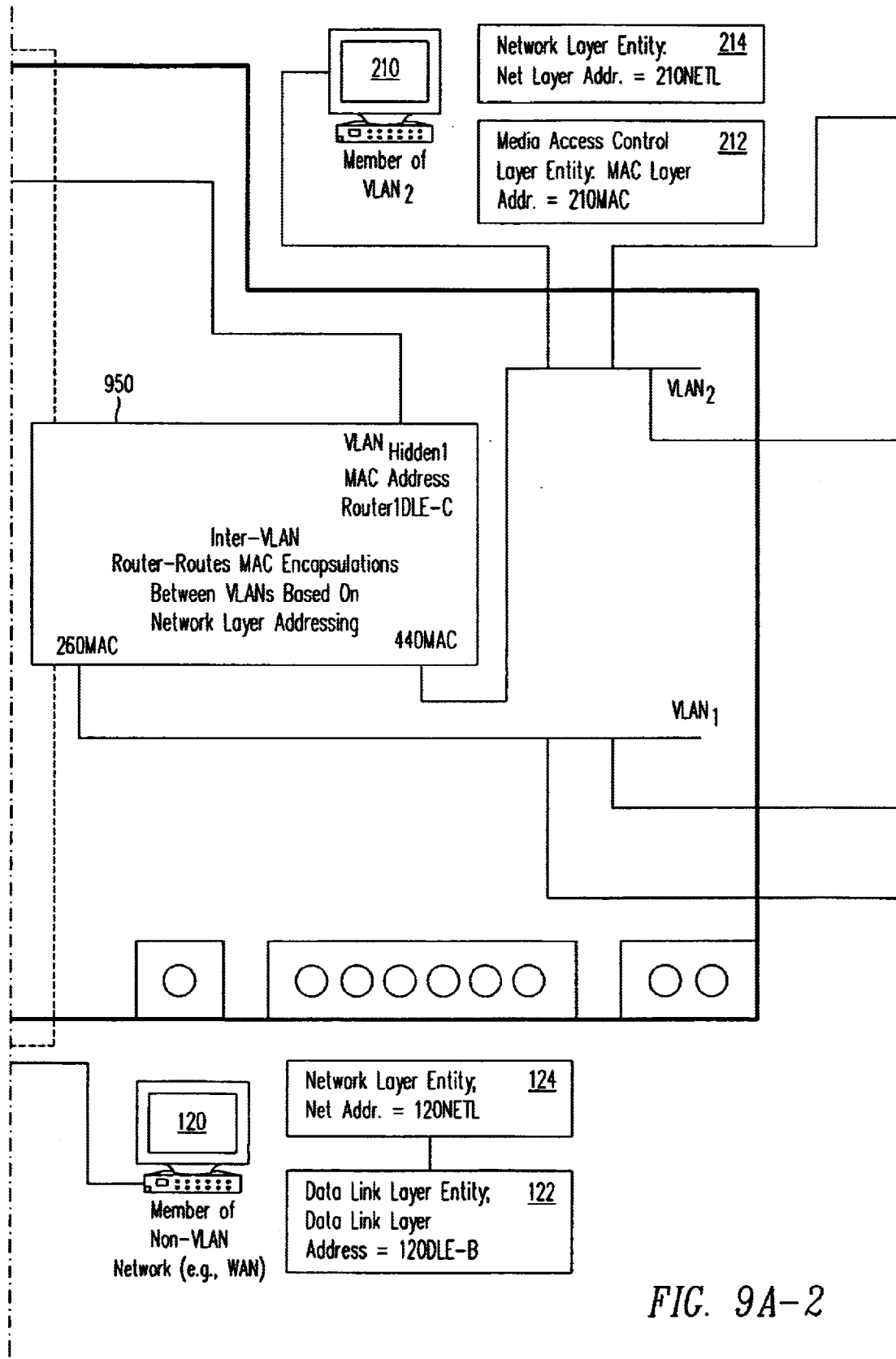
Figures 3, 9A:
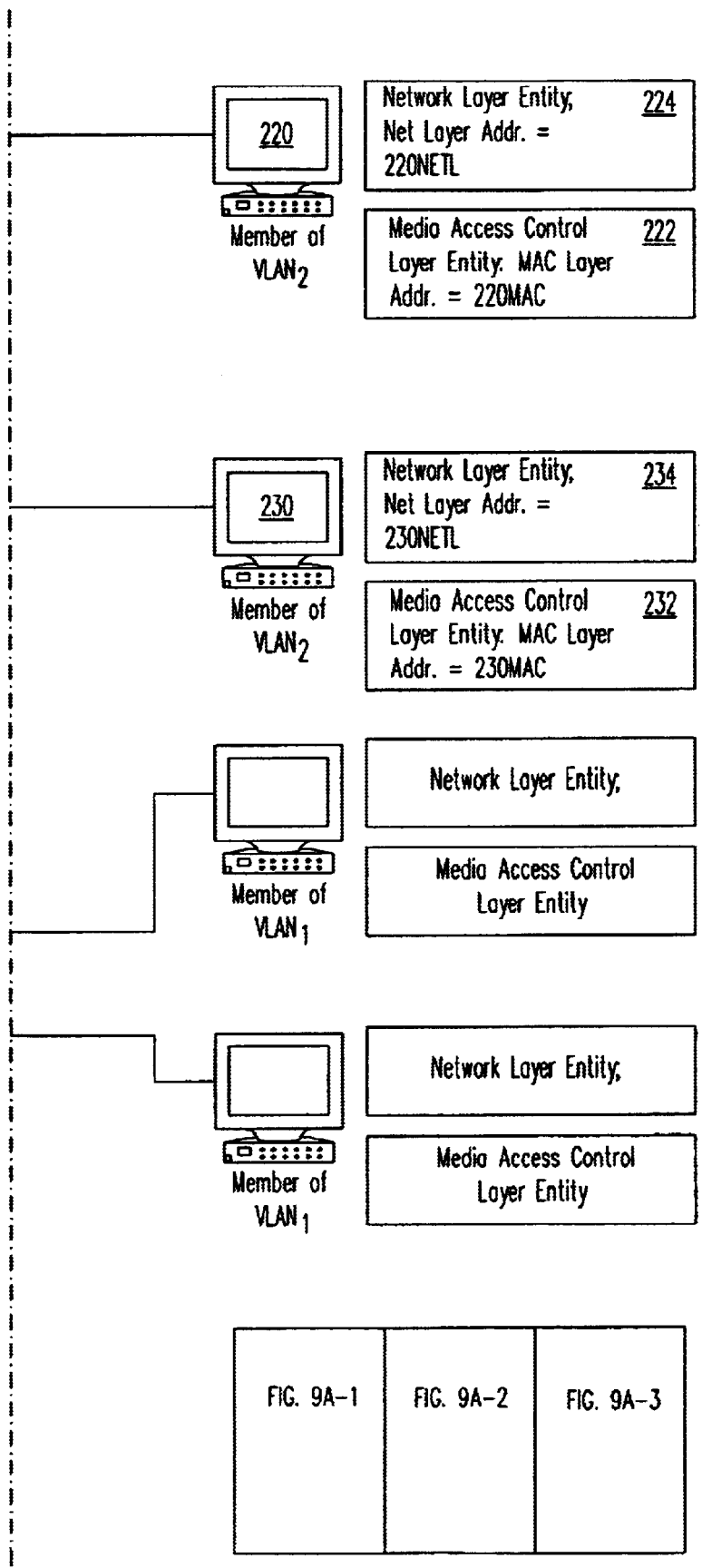
Figures 1, 9B:
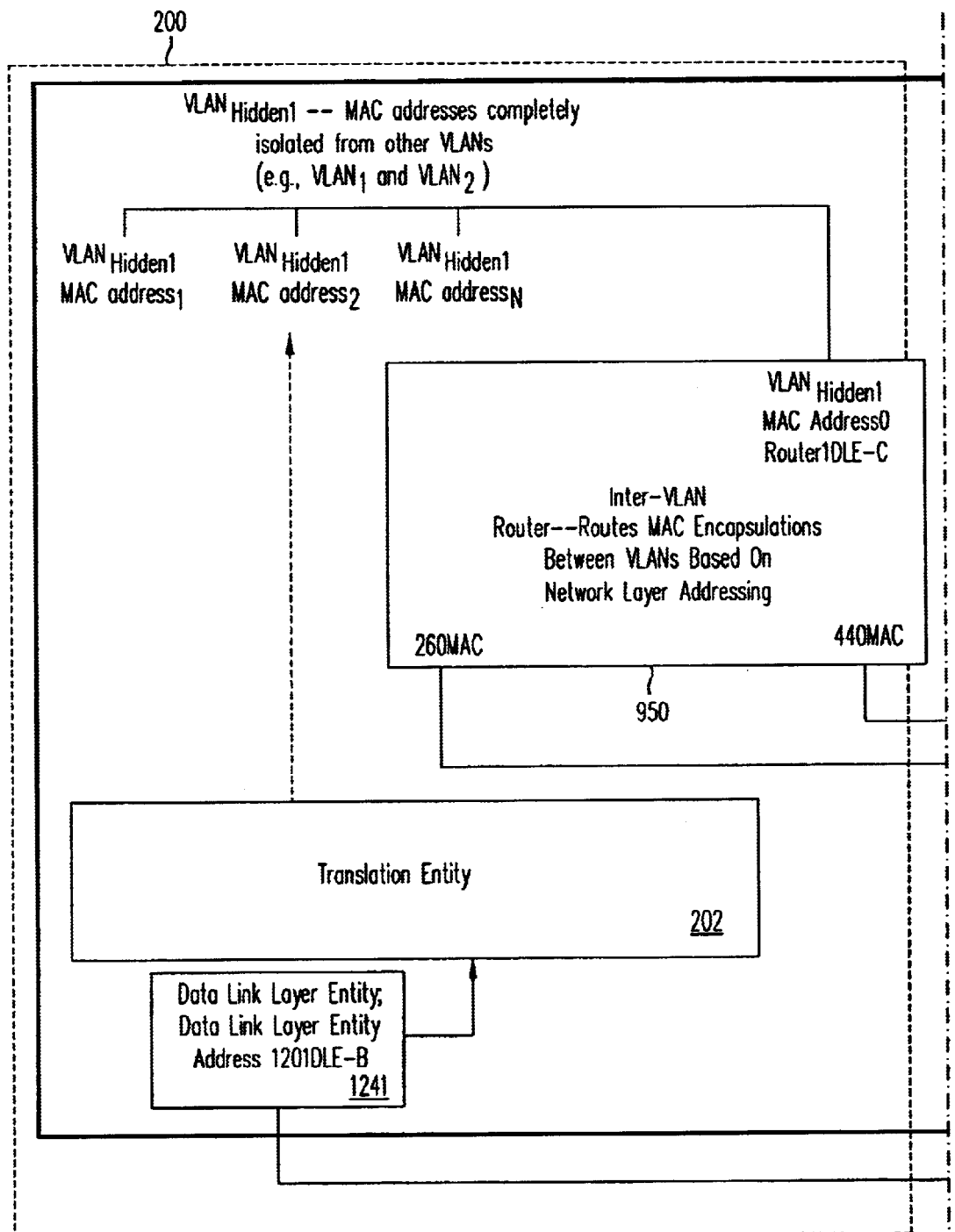
Figures 2, 9B:
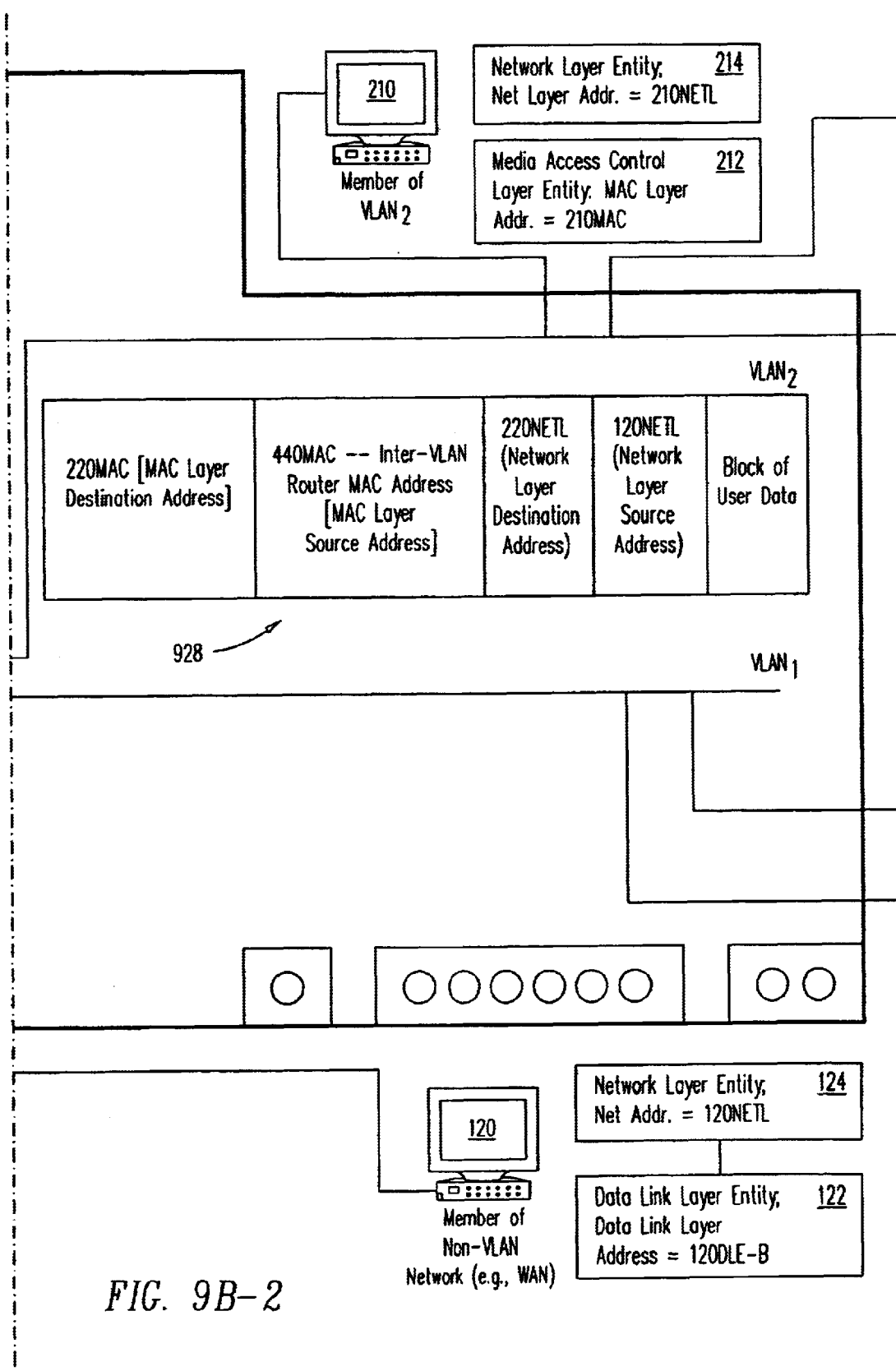
Figures 3, 9B:
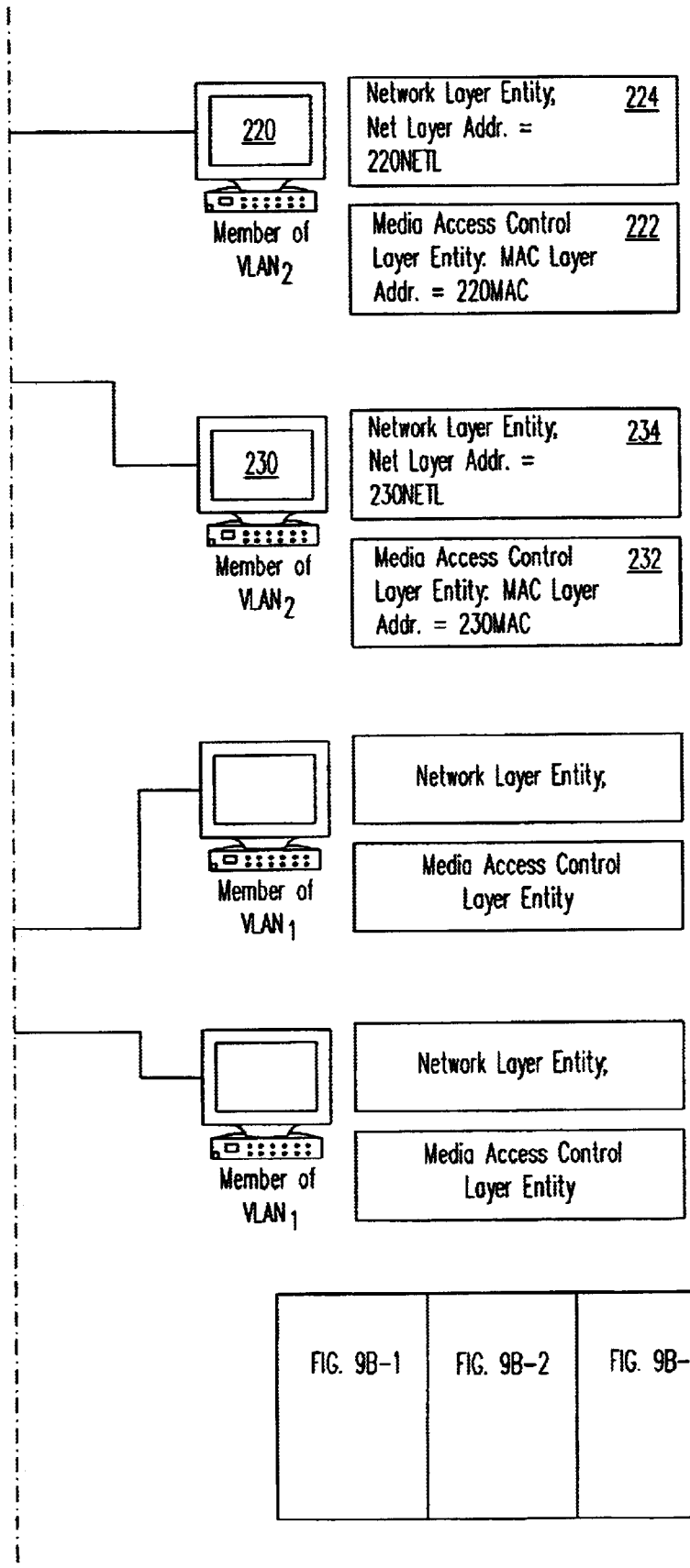

With reference now to FIGS. 9A and 9B, shown is an embodiment of the processes and devices illustrated above, where the data-link layer type-C environment is shown as an Ethernet protocol environment. Specifically with reference now to FIG. 9A, depicted is that data link entity 1241 receives data-link layer type-B packet 900 and recognizes that data-link layer type-B packet 900 has destination address 1201DLE-B and source address 120DLE-B. Data link layer entity 1241 recognizes that the destination address of the received data-link layer type-B packet is one internal to compatibility device 200 and thus alerts translation device 202.

Illustrated is that since data-link layer type-B packet 900 has a network layer protocol destination address which is native to the Ethernet protocol environment (i.e., the destination network address, 220NETL is the address of the network entity 224 shown resident within the Ethernet protocol (a specific type of data-link layer type-C protocol) environment of $VLAN_2$). Accordingly, shown is that translation entity 202 utilizes the basic "ingress" translation strategy shown and described in relation to FIG. 4. That is, continuing using the addressing utilized in FIGS. 3–8 for consistency and ease of understanding, depicted is that translation entity 202 replaces the data-link layer type-B destination and source addresses (e.g., destination: 1201DLE-B; source: 120DLE-B) with their "companion" addresses data-link layer type-C addresses (e.g., destination: Router1DLE-C; source: 2121DLE-C) in the hidden data-link layer Ethernet (a specific example of type-C) address space reserved for conversions between type-B and Ethernet data link environments(e.g., the $VLAN_{Hidden1}$ address space, where the type-C data link protocol is Ethernet protocol). Thereafter, translation entity 202 transmits $VLAN_{Hidden1}$ packet 926 onto $VLAN_{Hidden1}$)

Referring now to FIG. 9B, shown is that upon receipt of VLAN$_{Hidden1}$ packet 926, Inter-VLAN router 950 (which serves herein as a more specific example of the more general data-link layer type-C environment switch/router 220) examines the network layer destination address contained within VLAN$_{Hidden1}$ packet 926, and creates VLAN$_2$ packet 928 which is addressed to the correct media access control layer entity 222 having data-link layer address 220MAC (and which is an example of a type-C data-link layer entity) containing the network layer entity having the network layer destination address.

Figures 1, 10A:
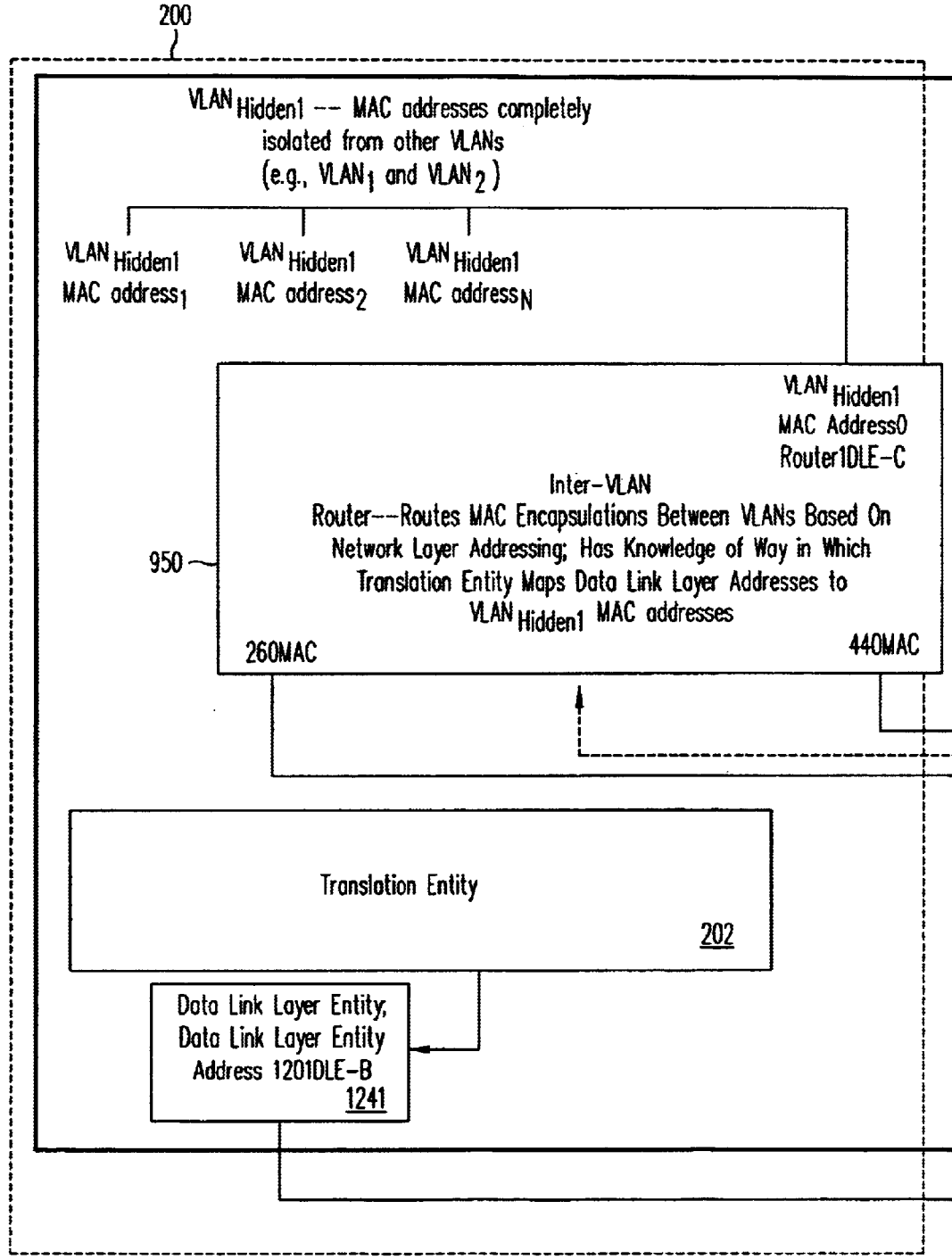
FIGS. 10A and 10B show an embodiment of the processes and devices illustrated above, where the data-link layer type-C environment is shown as an Ethernet protocol environment.
Figures 2, 10A:
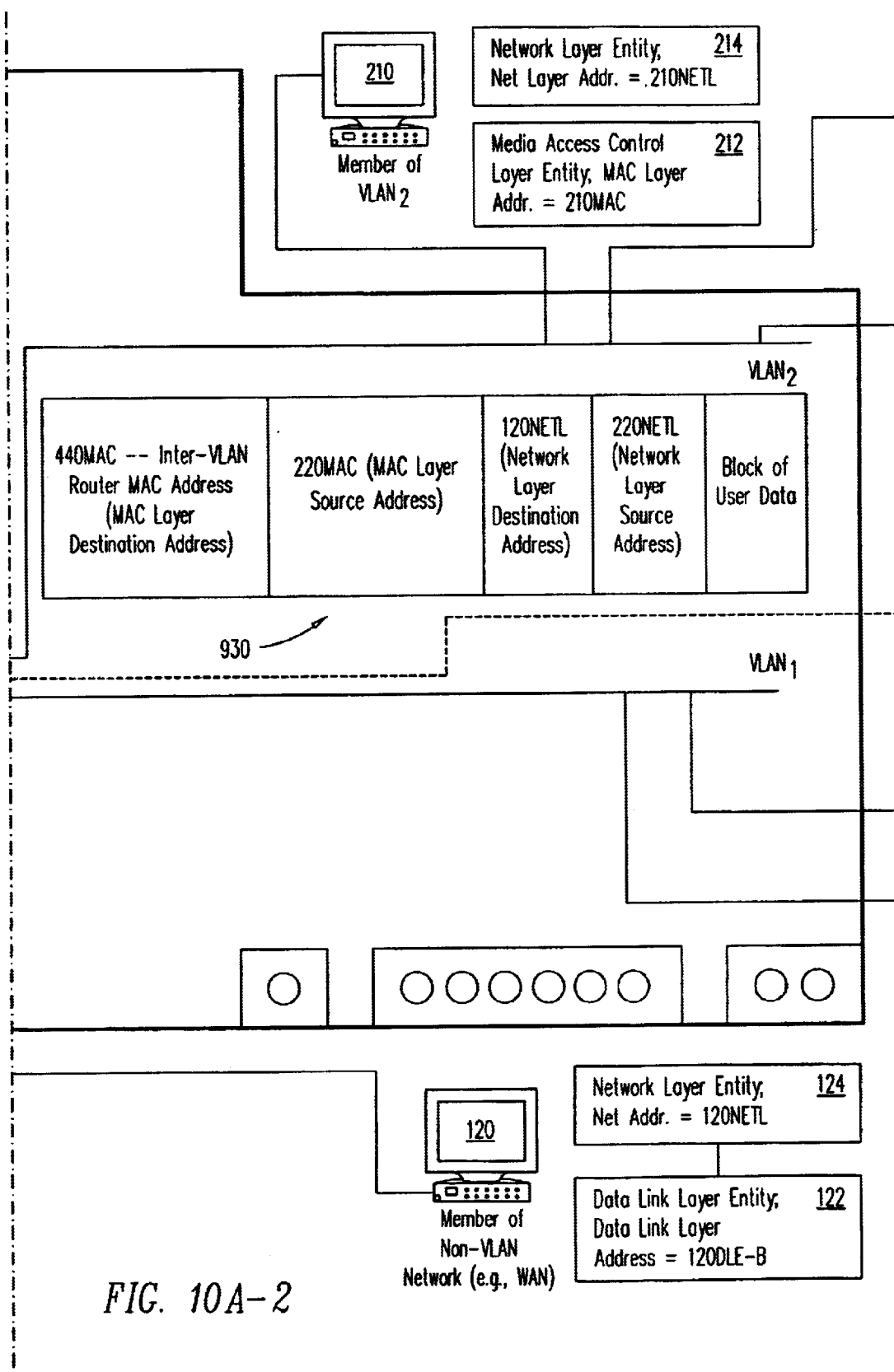
Figures 1, 10B:
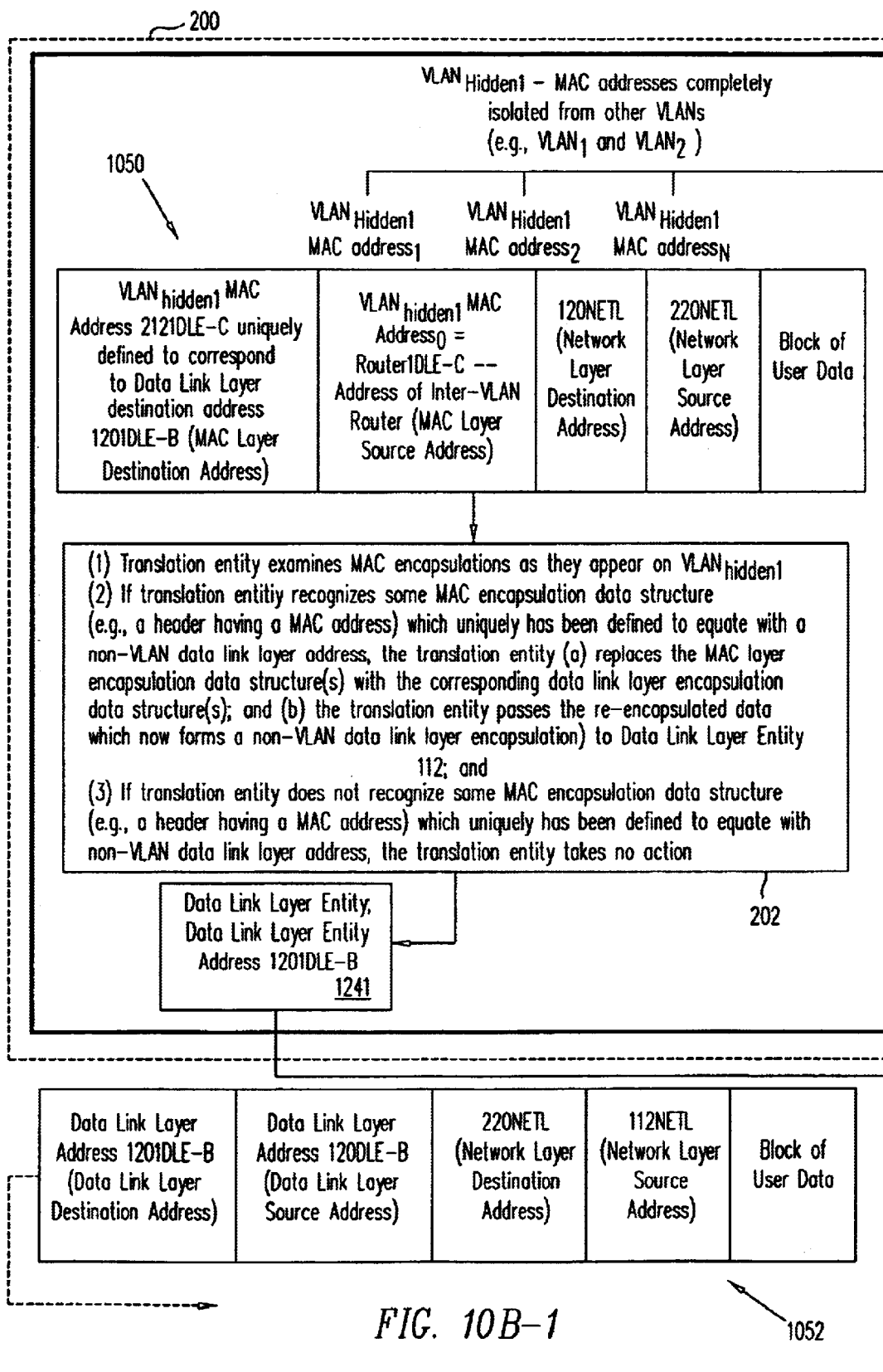
Figures 2, 10B:
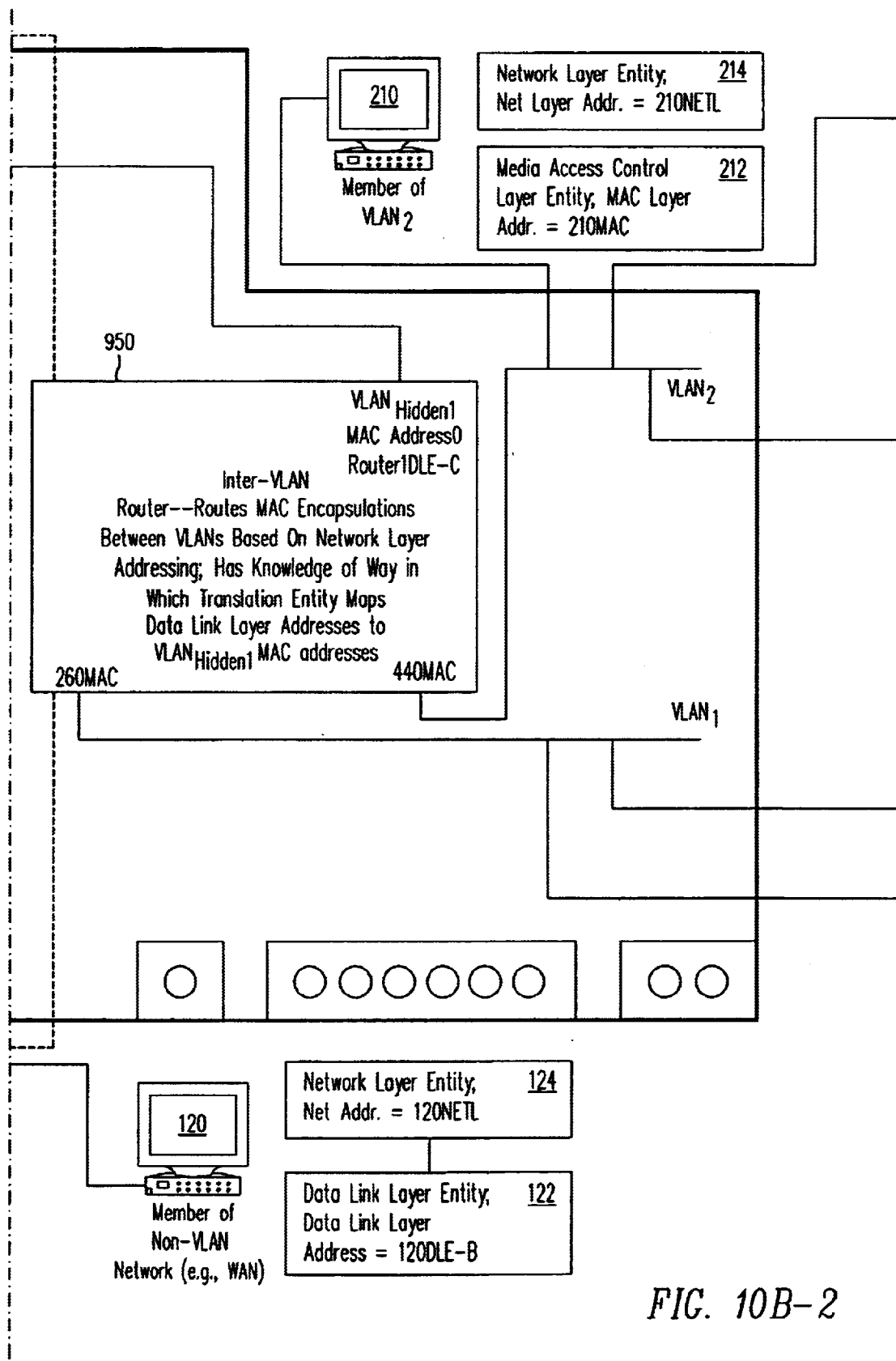
Figures 3, 10B:
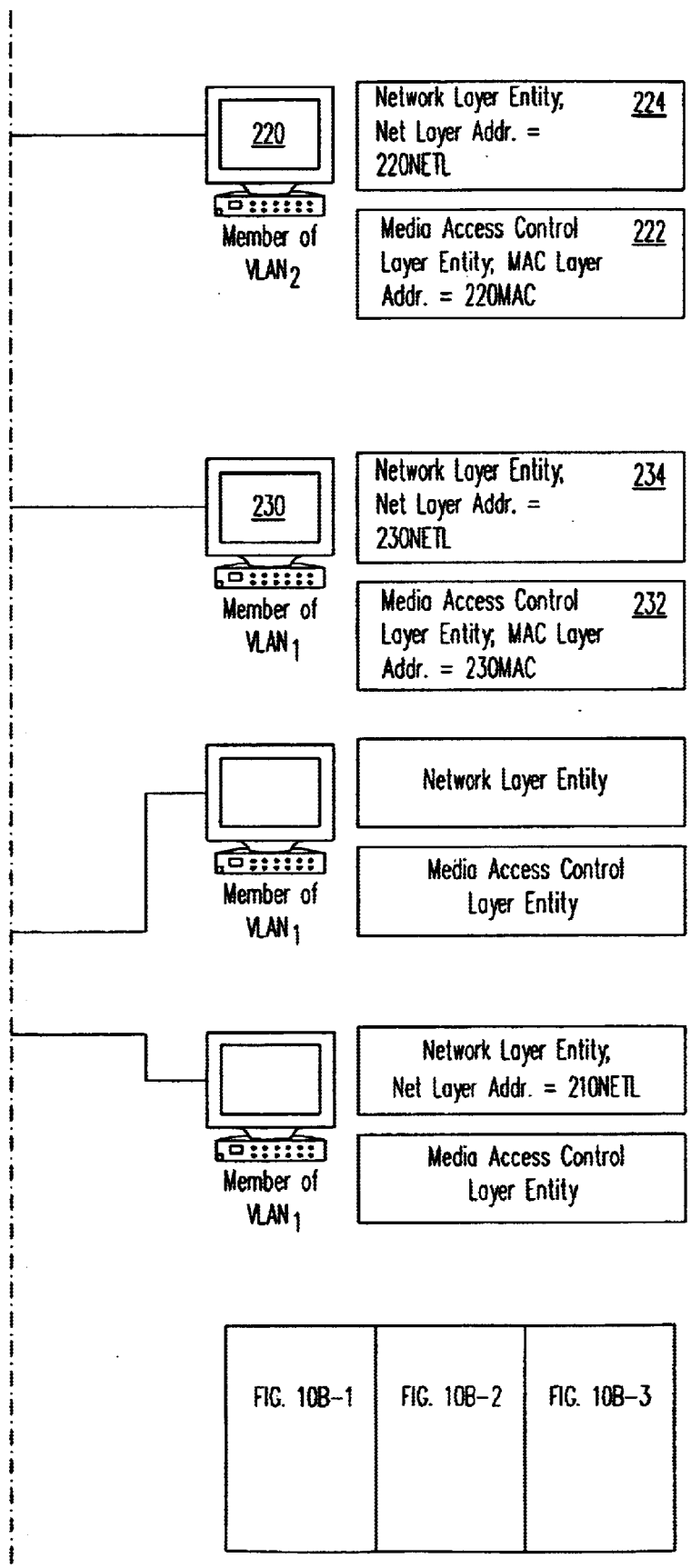

With reference now to FIGS. 10A and 10B, shown is an embodiment of the processes and devices illustrated above, where the data-link layer type-C environment is shown as an Ethernet protocol environment. Depicted is that Inter-VLAN router 950 (which serves as a more specific example of the more general data-link layer type-C environment switch/router 220) receives MAC layer (a specific example of the more-general data-link layer type-C) packet 930.

With reference now to FIG. 10B, shown is that Inter-VLAN router 950 recognizes that MAC layer packet 930 has a network layer destination address (120NETL) which the routing table of Inter-VLAN router 950 indicates should go to an VLAN$_{Hidden1}$ address 2121DLE-C. Accordingly, Inter-VLAN router 900 causes the creation of ONE (because the network layer packet indicates unicast transmission; if the network layer packet indicated multicast, directed broadcast, or broadcast transmission, the router would have most likely created more than one packet addressed to appropriate VLAN$_{Hidden1}$ addresses and transmitted such one or more packets onto VLAN$_{Hidden1}$) Ethernet packet 1050 having destination address of VLAN$_{Hidden1}$ address 2121DLE-C and source address of VLAN$_{Hidden1}$ address Router1DLE-C (indicating that the data link packet originates from the source). Thereafter, Inter-VLAN router transmits Ethernet packet 1050 to compatibility device 200.

Upon receipt of Ethernet packet 1050 over VLAN$_{Hidden1}$, translation entity 202 utilizes the basic "egress" translation mechanism for unicast depicted and described above in relation to FIG. 3. Accordingly, shown is that translation entity 202 replaces the data-link layer type-C destination and source addresses (e.g., destination: VLAN$_{Hidden1}$ address 2121DLE-C; source: VLAN$_{Hidden1}$ Router1DLE-c) with their "companion" data-link layer type-C addresses (e.g., destination: 120DLE-B; source: 1201DLE-C) to produce data-link layer type-B packet 1052. Thereafter, translation entity 202 transmits data-link layer type-B packet 1052 into the data-link layer type-B environment which will result in data-link layer type-B packet 1052 being received at computer 120 and ultimately passed to the correct network layer destination entity 120 having network layer address 124.

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can-be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using either synchronous or asynchronous communication links (e.g., TDM, packet, ATM, frame based communications links, or any combination of the foregoing described links).

The processes and devices disclosed herein can be implemented in virtually any network routers, bridges, or switches which span data communication network environments utilizing data-link layers having some form of incompatibility. In particular, the processes and described herein can be used in virtually any network router, bridge, and/or switch sold by Cisco Systems of San Jose, Calif. (Cisco is a trademark of Cisco Systems, Inc.). Those skilled in the are will recognize that the foregoing described network routers, bridges, or switches typically have several processors, memory devices, and/or a switching devices, as well as many other communications system components.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. A method comprising:

receiving a first-protocol data-link layer packet having a first-protocol address, the first-protocol data-link layer packet encapsulating a network-layer packet bound for a network layer entity native to a second-protocol data link layer environment;

directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address; and transmitting the at least one second-protocol data-link layer packet into the second-protocol data-link layer environment.

2. The method of claim 1, wherein the network-layer packet further comprises:

an indicator of a network layer transmission selected from the group comprising unicast transmission, multicast transmission, directed broadcast transmission, and broadcast transmission.

3. The method of claim 2, wherein the network layer packet is of a protocol selected from the group comprising (IP) internet protocol, IPX (internetwork packet exchange protocol), and AppleTalk protocol.

4. The method of claim 1, wherein said directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address further includes:

replacing a first-protocol data-link layer packet header with at least one second-protocol data-link layer packet header.

5. The method of claim 4, wherein said replacing a first-protocol data-link layer packet header with at least one second-protocol data-link layer packet header further includes:

replacing a first-protocol data-link layer packet destination header with at least one second-protocol data-link layer packet destination header.

6. The method of claim 5, wherein said replacing a first-protocol data-link layer packet destination header with at least one second-protocol data-link layer packet destination header further includes:

replacing a multicast first-protocol data-link layer packet destination header with at least one second-protocol data-link layer packet destination header selected from the group comprising a unicast second-protocol data-link layer packet destination header, and a multicast second-protocol data-link layer packet destination header.

7. The method of claim 5, wherein said replacing a first-protocol data-link layer packet destination header with at least one second-protocol data-link layer packet destination header further includes:

replacing a unicast first-protocol data-link layer packet destination header with at least one unicast second-protocol data-link layer packet destination header.

8. The method of claim 4, wherein said replacing a first-protocol data-link layer packet header with at least one second-protocol data-link layer packet header further includes:

replacing a first-protocol data-link layer packet source header with a second-protocol data-link layer packet source header.

9. The method of claim 4, wherein said replacing a first-protocol data-link layer packet header with a second-protocol data-link layer packet header further includes:

associating a first-protocol data-link layer entity with at least one second-protocol data-link layer entity.

10. The method of claim 9, wherein said associating a first-protocol data-link layer entity with at least one second-protocol data-link layer entity further includes:

associating a first-protocol data-link layer entity internal to a compatibility device with a second protocol data-link entity external to the compatibility device; and associating a second-protocol data-link layer entity internal to the compatibility device with a first-protocol data-link entity external to the compatibility device.

11. The method of claim 9, wherein said associating a first-protocol data-link layer entity with at least one second-protocol data-link layer entity further includes:

associating a first-protocol data-link layer entity internal to a compatibility device with a plurality of second-protocol data-link entities external to the compatibility device; and associating a second-protocol data-link layer entity internal to the compatibility device with a first-protocol data-link entity external to the compatibility device.

12. The method of claim 1, wherein said directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address further includes:

detecting a network layer source address native to a first-protocol data-link layer environment and a network layer destination address native to a second protocol data-link layer environment; and re-addressing the first-protocol data-link layer packet into a first-protocol address space reserved for the translation from the first-protocol to the second protocol.

13. The method of claim 12, wherein said re-addressing the first-protocol data-link layer packet into a first-protocol address space reserved for the translation from the first-protocol to the second protocol further includes:

creating at least one first-protocol data-link layer packet, each at least one first-protocol packet having an address in the first-protocol address space, selected from the group comprising unicast address, a multicast address, a directed broadcast address, and a broadcast address.

14. A system comprising:

means for receiving a first-protocol data-link layer packet having a first-protocol address, the first-protocol data-link layer packet encapsulating a network-layer packet bound for a network layer entity native to a second-protocol data link layer environment;

means for directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address; and means for transmitting the at least one second-protocol data-link layer packet into the second-protocol data-link layer environment.

15. The system of claim 14, wherein the network-layer packet further comprises:
   an indicator of a network layer transmission selected from the group comprising unicast transmission, multicast transmission, directed broadcast transmission, and broadcast transmission.

16. The system of claim 15, wherein the network layer packet is of a protocol selected from the group comprising (IP) internet protocol, IPX (internetwork packet exchange protocol), and AppleTalk protocol.

17. The system of claim 14, wherein said means for directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address further includes:
   means for replacing a first-protocol data-link layer packet header with at least one second-protocol data-link layer packet header.

18. The system of claim 17, wherein said means for replacing a first-protocol data-link layer packet header with at least one second-protocol data-link layer packet header further includes:
   means for replacing a first-protocol data-link layer packet destination header with at least one second-protocol data-link layer packet destination header.

19. The system of claim 18, wherein said means for replacing a first-protocol data-link layer packet destination header with at least one second-protocol data-link layer packet destination header further includes:
   means for replacing a multicast first-protocol data-link layer packet destination header with at least one second-protocol data-link layer packet destination header selected from the group comprising a unicast second-protocol data-link layer packet destination header, and a multicast second-protocol data-link layer packet destination header.

20. The system of claim 18, wherein said means for replacing a first-protocol data-link layer packet destination header with at least one second-protocol data-link layer packet destination header further includes:
   means for replacing a unicast first-protocol data-link layer packet destination header with at least one unicast second-protocol data-link layer packet destination header.

21. The system of claim 17, wherein said means for replacing a first-protocol data-link layer packet header with at least one second-protocol data-link layer packet header further includes:
   means for replacing a first-protocol data-link layer packet source header with a second-protocol data-link layer packet source header.

22. The system of claim 17, wherein said means for replacing a first-protocol data-link layer packet header with a second-protocol data-link layer packet header further includes:
   means for associating a first-protocol data-link layer entity with at least one second-protocol data-link layer entity.

23. The system of claim 22, wherein said means for associating a first-protocol data-link layer entity with at least one second-protocol data-link layer entity further includes:
   means for associating a first-protocol data-link layer entity internal to a compatibility device with a second protocol data-link entity external to the compatibility device; and
   means for associating a second-protocol data-link layer entity internal to the compatibility device with a first-protocol data-link entity external to the compatibility device.

24. The system of claim 22, wherein said means for associating a first-protocol data-link layer entity with at least one second-protocol data-link layer entity further includes:
   means for associating a first-protocol data-link layer entity internal to a compatibility device with a plurality of second-protocol data-link entities external to the compatibility device; and
   means for associating a second-protocol data-link layer entity internal to the compatibility device with a first-protocol data-link entity external to the compatibility device.

25. The system of claim 14, wherein said means for directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address further includes:
   means for detecting a network layer source address native to a first-protocol data-link layer environment and a network layer destination address native to a second protocol data-link layer environment; and
   means for re-addressing the first-protocol data-link layer packet into a first-protocol address space reserved for the translation from the first-protocol to the second protocol.

26. The system of claim 25, wherein said means for re-addressing the first-protocol data-link layer packet into a first-protocol address space reserved for the translation from the first-protocol to the second protocol further includes:
   means for creating at least one first-protocol data-link layer packet, each at least one first-protocol packet having an address in the first-protocol address space, selected from the group comprising unicast address, a multicast address, a directed broadcast address, and a broadcast address.

27. The system of claim 14 wherein the system is a router comprising:
   at least one communication system component selected from a processor, a memory, and a switch.

28. A program product comprising:
   signal bearing media bearing programming adapted to perform the following operations:
      receiving a first-protocol data-link layer packet having a first-protocol address, the first-protocol data-link layer packet encapsulating a network-layer packet bound for a network layer entity native to a second-protocol data link layer environment;
      directly translating the first-protocol data-link layer packet to at least one second-protocol data-link layer packet encapsulating at least a part of the network layer packet, where the at least one second-protocol data-link layer packet has addressing comprising a pre-defined second protocol companion address of the first-protocol address; and
      transmitting the at least one second-protocol data-link layer packet into the second-protocol data-link layer environment.

29. The program product of claim 28, wherein said signal bearing media comprises recordable media.

30. The program product of claim 28, wherein said signal bearing media comprises transmission media.

* * * * *